(12) United States Patent
Bai et al.

(10) Patent No.: US 7,722,972 B2
(45) Date of Patent: May 25, 2010

(54) APPARATUS AND METHOD FOR CONTROLLING A FUEL CELL USING THE RATE OF VOLTAGE RECOVERY

(75) Inventors: Lijun Bai, Spokane, WA (US); David R. Lott, Spokane, WA (US); Mark Hernick, Spokane, WA (US)

(73) Assignee: Relion, Inc., Spokane, WA (US)

( * ) Notice: Subject to any disclaimer, the term of this patent is extended or adjusted under 35 U.S.C. 154(b) by 1297 days.

(21) Appl. No.: 11/207,123

(22) Filed: Aug. 17, 2005

(65) Prior Publication Data

US 2007/0042243 A1  Feb. 22, 2007

(51) Int. Cl.
*H01M 8/04* (2006.01)
*H01M 8/12* (2006.01)
*H01M 10/44* (2006.01)
*H02J 7/00* (2006.01)

(52) U.S. Cl. .............................. 429/23; 429/22; 320/101

(58) Field of Classification Search ................. 320/101, 320/110; 429/13, 22, 23
See application file for complete search history.

(56) References Cited

U.S. PATENT DOCUMENTS

| 6,030,718 | A | 2/2000 | Fuglevand et al. |
| 6,096,449 | A | 8/2000 | Fuglevand et al. |
| 6,218,035 | B1 | 4/2001 | Fuglevand et al. |
| 6,468,682 | B1 * | 10/2002 | Fuglevand et al. ............ 429/26 |
| 6,620,538 | B2 * | 9/2003 | Bai et al. ....................... 429/23 |
| 2002/0034669 | A1 * | 3/2002 | Kobayashi et al. ............ 429/25 |
| 2006/0197536 | A1 * | 9/2006 | Gandhi et al. ................ 324/426 |

\* cited by examiner

*Primary Examiner*—Edward Tso
*Assistant Examiner*—Ahmed Omar
(74) *Attorney, Agent, or Firm*—Wells St. John P.S.

(57) ABSTRACT

An apparatus and method for controlling a fuel cell which has an anode and a cathode includes first and second circuitry which are utilized, to selectively short the anode to the cathode and further is useful in measuring the rate of voltage recovery following shorting, and which can be utilized as a predictor of appropriate fuel cell hydration and can be further utilized to adjust the operational conditions of the fuel cell.

40 Claims, 18 Drawing Sheets

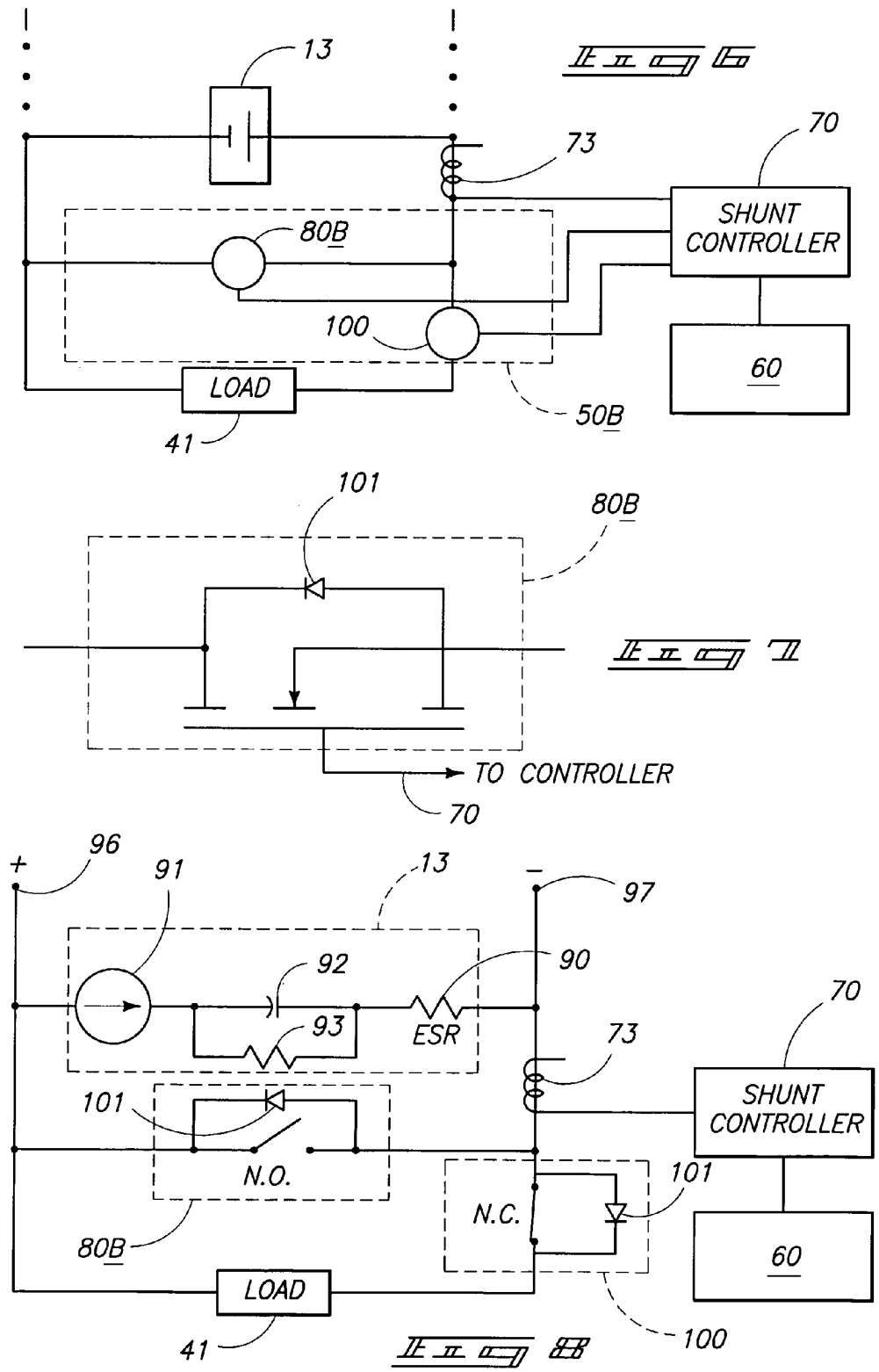

APPARATUS AND METHOD FOR CONTROLLING A FUEL CELL USING THE RATE OF VOLTAGE RECOVERY

TECHNICAL FIELD

The present invention relates to an apparatus and method for controlling a fuel cell, and more specifically to an invention which employs a voltage recovery rate of the fuel cell to control, at least in part, the operation of the fuel cell.

BACKGROUND OF THE INVENTION

The prior art is replete with numerous examples of fuel cells which are employed for various end uses. A fuel cell is an electrochemical device which reacts a fuel and an oxidant to produce electricity and a byproduct which is typically water. A typical fuel supply for a fuel cell is hydrogen, and the typical oxidant supplied to the fuel cell is oxygen (or more commonly ambient air). Other fuels and oxidants can be employed depending upon operational conditions. Various fuel cell designs have been proposed through the years including fuel cells in various stack-like arrangements. Yet further, fuel cells such as described in U.S. Pat. Nos. 6,030,718 and 6,468,682 have been commercially introduced and have avoided many of the shortcomings associated with stack-like designs and arrangements. The teachings of each of these patents are incorporated by reference herein.

In U.S. Pat. No. 6,096,449 to Fuglevand et al., the inventors disclosed a shunt controller which is electrically coupled with a fuel cell and which at times shunts electrical current between the anode and cathode of the fuel cell to achieve various benefits including boosting the electrical power output of same. It is speculated that this repeated, and periodic shorting causes each of the fuel cell membranes to be "conditioned", that is, such shorting is believed to cause an increase in the amount of water that is made available to the membrane electrode diffusion assembly (MEDA) of the fuel cell thereby increasing that assembly's performance. Additionally, it is also conceivable that the shorting provides, at least in part, a short term increase in heat output that is sufficient to evaporate excess water from associated diffusion layers that are mounted on or made integral with the membrane electrode diffusion assembly.

In U.S. Pat. No. 6,620,538, and which is incorporated by reference herein, a fuel cell power system was described and which included circuitry which was configured to measure the equivalent series resistance (ESR) of the fuel cell in timed relation to the shorting as described in the earlier U.S. Pat. No. 6,096,449. This equivalent series resistance (ESR) was then employed to adjust the operation of the fuel cell in order to optimize the hydration, and other operational characteristics of the fuel cell.

While the assorted fuel cells and other methodology which has been described, above, have worked with a great deal of success, further research has been conducted in order to develop other measures which are still further more accurate indicators of the operational hydration of a functioning fuel cell.

Therefore, a method and apparatus for controlling a fuel cell which avoids the shortcomings attendant with the prior art devices and practices utilized heretofore is the subject matter of the present application.

SUMMARY OF THE INVENTION

A first aspect of the present invention relates to an apparatus for controlling a fuel cell which has an anode and a cathode, and which further includes first circuitry for selectively shorting the anode to the cathode so as to simultaneously increase a current and decrease a voltage output of the fuel cell; and second circuitry for measuring the rate of voltage recovery following shorting, and wherein the rate of voltage recovery is employed, at least in part, to control and/or monitor the operation of the fuel cell.

Another aspect of the present invention relates to an apparatus for controlling a fuel cell, and which has a voltage and current output, and which further includes a controller which is operably coupled with the fuel cell, and which periodically increases the current output of the fuel cell; and circuitry electrically coupled with the controller, and which is further disposed in voltage and current sensing relation relative to the fuel cell, and wherein the fuel cell, when optimally hydrated, has a rate of voltage recovery following the periodic reduction of the voltage output of the fuel cell, by the controller, and which is defined by a first line having a slope, and wherein the circuitry determines the operational hydration of the fuel cell based, at least in part, upon the relative comparison of the rate of voltage recovery of the fuel cell to the slope of the first line.

Still another aspect of the present invention relates to a method for controlling a fuel cell which includes the steps of providing a fuel cell which has an anode and a cathode, and which produces electrical power having a current and voltage output; periodically electrically shorting the anode of the fuel cell to the cathode of the fuel cell to increase the current output of the fuel cell; measuring a rate of voltage recovery experienced by the fuel cell in timed relation to the electrical shorting; and determining the amount of the hydration of the fuel cell from the measured rate of voltage recovery.

Still further, another aspect of the present invention relates to a method for controlling a fuel cell which includes the steps of providing a fuel cell which has a first membrane electrode diffusion assembly, and wherein the first membrane electrode diffusion assembly has an anode, a cathode, and a gas diffusion layer; providing a source of fuel to the anode side of the first membrane electrode diffusion assembly, and providing a source of an oxidant to the cathode side of the first membrane electrode diffusion assembly, and wherein the fuel cell produces a voltage and current output when supplied with the sources of fuel and oxidant; providing a voltage sensor which is electrically coupled in voltage sensing relation relative the first membrane electrode diffusion assembly; providing a current sensor which is electrically coupled in current sensing relation relative to the first membrane electrode diffusion assembly; providing a controller which is electrically coupled with the first membrane electrode diffusion assembly, and which is configured to periodically electrically short the anode to the cathode thereof, and which substantially increases the current output of the first membrane electrode diffusion assembly; previously determining an optimal sustainable voltage and current output for a substantially identical second membrane electrode diffusion assembly; measuring a rate of voltage recovery of the second membrane electrode diffusion assembly which is producing the optimal sustainable voltage and current output immediately following the electrical shorting of the second membrane electrode diffusion assembly, and wherein the optimal sustainable voltage and current output is indicative of an optimal hydrated state for the second membrane electrode diffusion assembly; periodically electrically shorting the anode to the cathode of the first membrane electrode diffusion assembly; measuring a rate of the voltage recovery of the first membrane electrode diffusion assembly immediately following the periodic electrical shorting of the anode to the cathode thereof; determining whether the rate of recovery of the voltage of the first membrane electrode diffusion assembly immediately following the periodic electrical shorting is greater than or less than the voltage recovery rate as experienced by the substantially identical second membrane electrode diffusion assembly; predicting the operational hydration of the first membrane electrode diffusion assembly, based, at least in part, upon whether the voltage recovery rate of the first membrane electrode diffusion assembly is greater or less than the voltage recovery rate as experience by the substantially identical second membrane electrode diffusion assembly; and adjusting the frequency and duration of the periodic electrical shorting of the first membrane electrode diffusion assembly to optimize both the operational hydration of the first membrane electrode diffusion assembly, and the electrical current and voltage output thereof, as well as the operational temperatures; bus current; fan and vane position; and bleed cycle for the same fuel cell.

These and other aspects of the present invention will be described in greater detail hereinafter.

BRIEF DESCRIPTION OF THE DRAWINGS

Preferred embodiments of the invention are described below with reference to the following accompanying drawings.

FIG. 6 is a circuit diagram showing shunt control circuitry in accordance with another embodiment of the present invention.

FIG. 7 shows the construction details in one embodiment of the invention of a switch which is included in the circuitry as seen in FIG. 6.

FIG. 8 is an equivalent circuit diagram of the circuitry as seen in FIG. 6.

FIG. 21 is a graphical depiction of the voltage recovery rate versus operational time, for two different fuel cells, one being in a dehydrated state, and the other being optimally hydrated.

FIG. 23 is a graphical depiction of the relationship of the voltage recovery rate for the hydration conditions within fuel cells, and which shows the performance of the respective fuel cells from an overly hydrated or flooded condition, to an optimally hydrated state.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
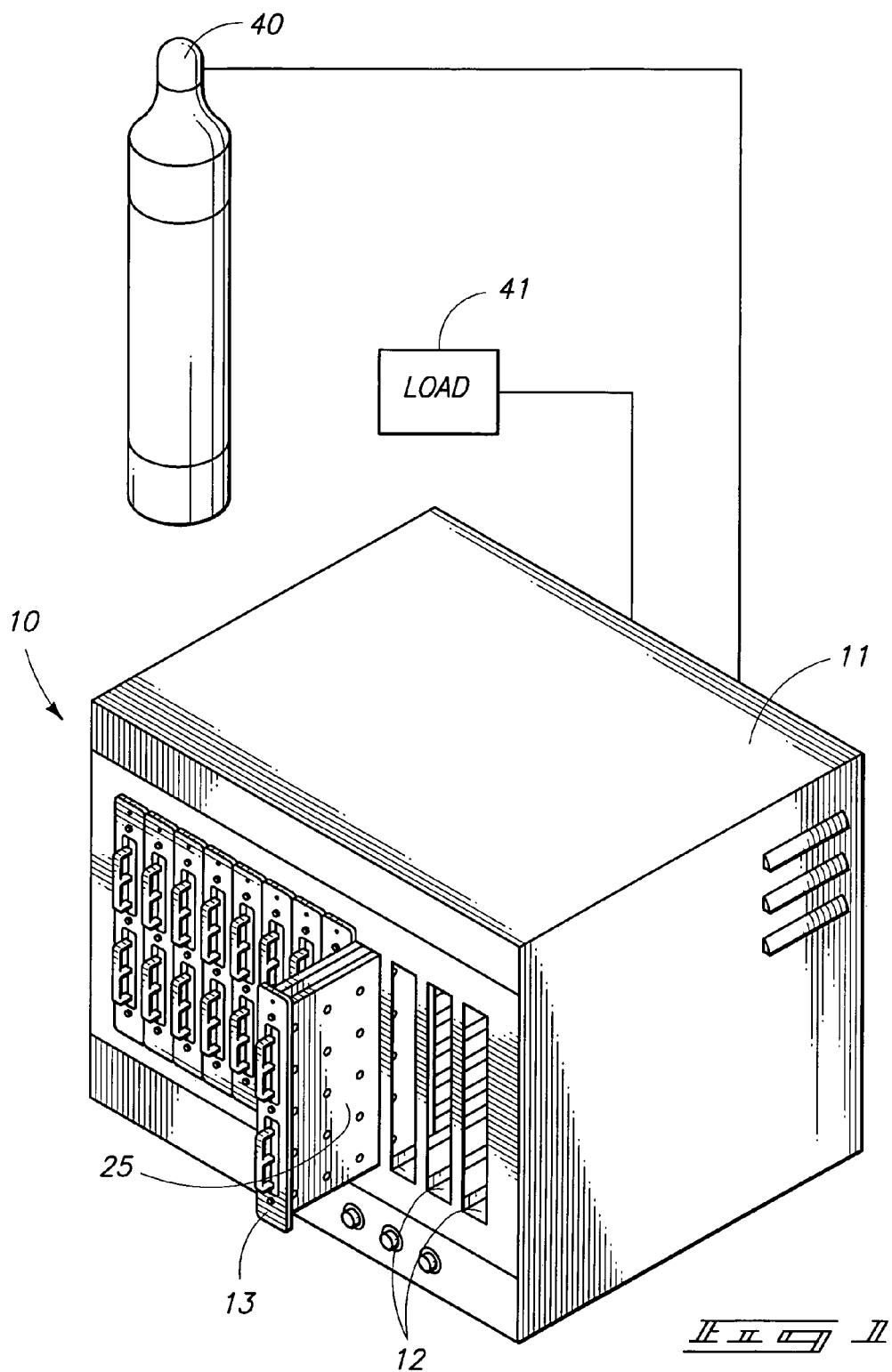
FIG. 1 is a perspective view of a fuel cell power system including a proton exchange membrane (PEM) fuel cell module and a subrack in accordance with the teachings of the present invention.
Figure 12:
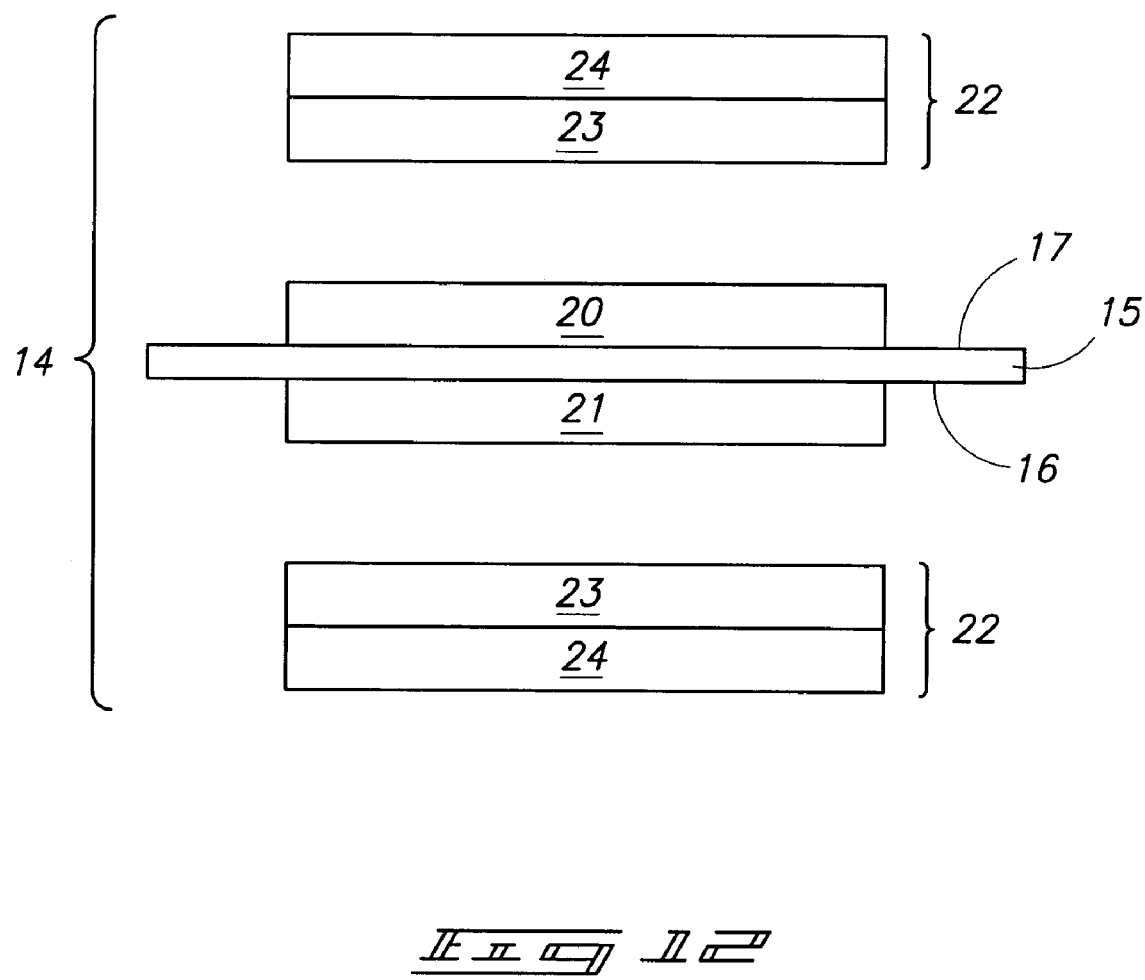
FIG. 12 is a greatly simplified, exploded view of a membrane electrode diffusion assembly of the present invention.

Referring now to FIG. 1, a proton exchange membrane fuel cell power system of the present invention is shown. As seen therein, the fuel cell power system 10 includes among other features a housing 11 which supports a subrack 12. The subrack 12 is positioned appropriately within the housing 11. A plurality of hand manipulatable fuel cell modules or cartridges such are shown, and which are discussed in further significant detail in U.S. Pat. No. 6,468,682, the teachings of which are incorporated by reference herein. The respective fuel cell cartridges or modules 13 each enclose at least one membrane electrode diffusion assembly as generally depicted in FIG. 12 by the numeral 14. The membrane electrode diffusion assembly includes an ion conducting membrane 15 which has a first anode side 16, and an opposite cathode side 17. A cathode electrode 20 is mounted in ion conducting relation relative to the cathode side 17, and an anode electrode 21 is mounted in ion conducting relation relative to the anode side 16. As should be understood by the exploded view of FIG. 12, an electrically conductive diffusion layer 22 is mounted in juxtaposed relation thereagainst each of the cathode and anode electrodes 20 and 21, respectively. The electrically conductive diffusion layer 22 includes a first diffusion layer 23, and a second diffusion layer 24. As described more fully in U.S. Pat. No. 6,218,035, the teachings of which are incorporated by reference herein, these diffusion layers may be fabricated from different materials and may have different overall porosities in the X, Y, or Z axes. The present apparatus and methodology is effective for predicting the hydration levels of these several diffusion layers 23 and 24 and the ion conducting membrane 15 so as to optimize the operational characteristics of the fuel cell power system.

Figure 13:
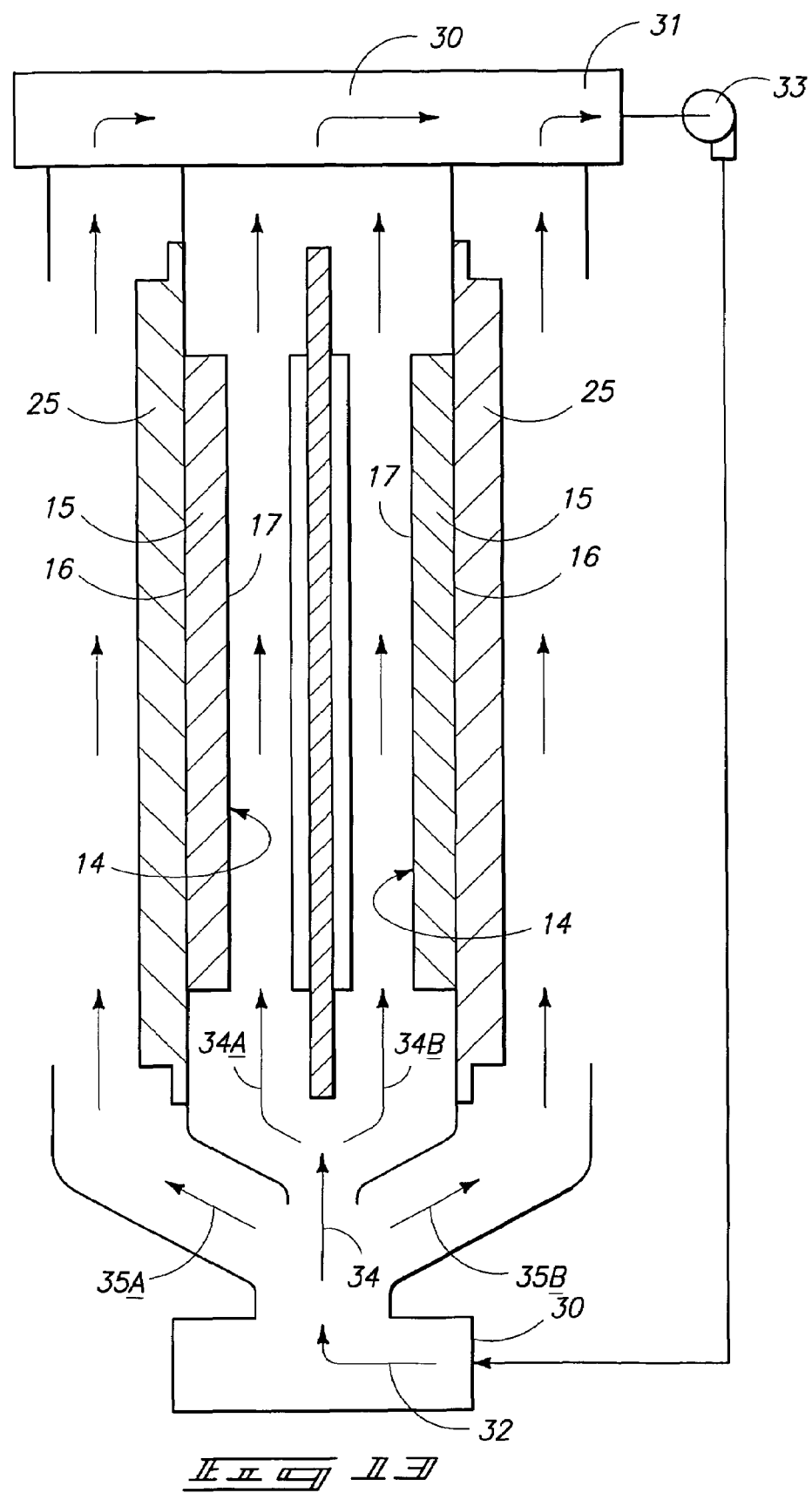
FIG. 13 is a fragmentary, schematic representation of a proton exchange membrane (PEM) fuel cell module as might be employed in the fuel cell power system as seen in FIG. 1.

Referring now to FIG. 13, it will be understood that the fuel cell power system 10 and more specifically the individual fuel cell modules 13, when rendered operable, produce heat energy as a result of operation. This heat energy must be dissipated to effectively control the operation of the fuel cell module. In this regard, and as seen in FIGS. 1 and 13, each of the fuel cell modules include a pair of anode heat sinks 25 which are disposed in heat removing relation relative to the anode side 16 of each of the ion conducting membranes 15. The respective anode heat sinks are employed to dissipate, at least in part, the heat generated by the fuel cell module into an air stream, as will be discussed below. In the arrangement as seen in FIGS. 1 and 13, the housing 11 includes an air plenum 30 having a first intake end 31, and an opposite, second exhaust end 32. The air plenum 30 is coupled to a fan or air movement assembly 33 which is operable to draw or move a source of air, such as from the ambient environment, through the air plenum and into, and past, the fuel cell modules so as to control the operating temperature of same. This same air movement assembly may further include a selectively moveable vane (not shown) and which facilitates the mixing of ambient air so as to optimize the operation of the fuel cell power system. In this regard, the air plenum 30 produces a first cathode air stream 34 which is later bifurcated as seen in FIG. 13 into the stream 34A and B, and which supplies oxygen to the cathode side 17 of the membrane electrode diffusion assembly 14 and further removes less than a preponderance of the heat energy generated by the fuel cell membrane 15. Further, the air plenum operates to provide an anode heat sink air stream 35 which is further bifurcated into two components 35A and B, and which individually move along opposite sides of the fuel cell module 13 and over each of the anode heat sinks 25. As the anode heat sink air stream components 35A and B move over the opposite anode heat sinks, the anode heat sink air stream 35 operates to remove a preponderance of the heat energy generated by the fuel cell module 13 during operation. Therefore, in this arrangement, and as discussed more fully in U.S. Pat. No. 6,468,682, the present invention provides a fuel cell module 13 which has a bifurcated air flow which regulates, at least in part, the operational temperature of the fuel cell module by removing the heat energy generated therefrom. One aspect of the present invention relates to the control of the operating temperature of the fuel cell as seen most clearly by reference to FIGS. 21-24, respectively.

As seen in FIG. 1, a plurality of individual fuel cell modules 13 are supported on the subrack 12, and are disposed in predetermined spaced relation one relative to the other. As discussed in many of the earlier patents, the fuel cell power system 10 is configured in a manner where at least one of the fuel cell modules 13 can be easily removed from the subrack 12, by hand, while the remaining fuel cell modules continue to operate. This removal is normally accomplished without the use of any tools, however, it may be necessary in some commercial or industrial applications where vibration and other physical forces may be imparted to the assembly to use variously designed fasteners to releasably secure the individual modules 13, to the subrack to prevent the unintentional displacement or dislocation of the respective modules from the subrack. If fasteners are employed, the hand tools which will be employed to remove the fasteners will be simple hand tools. Further, these same modules will be removed in a matter of minutes, as opposed to the prior art stack arrangements where the replacement of a damaged membrane electrode diffusion assembly may take hours to accomplish. The fuel cell power system 10 further includes a conduit, (not shown) to couple the fuel cell modules 13 to a source of fuel 40. The fuel cell power system further includes electrical conductors and connectors (not shown) to couple the electrical output of the fuel cell modules to a load 41. In the present invention, the fuel cell, in operation, has a voltage and current output which is supplied to the load 41. In the present invention as will be discussed in greater detail hereinafter, the voltage recovery rate which is immediately determined following the shunting of the fuel cell modules is utilized, at least in part, to control the voltage and current output of the fuel cell.

Figure 2:
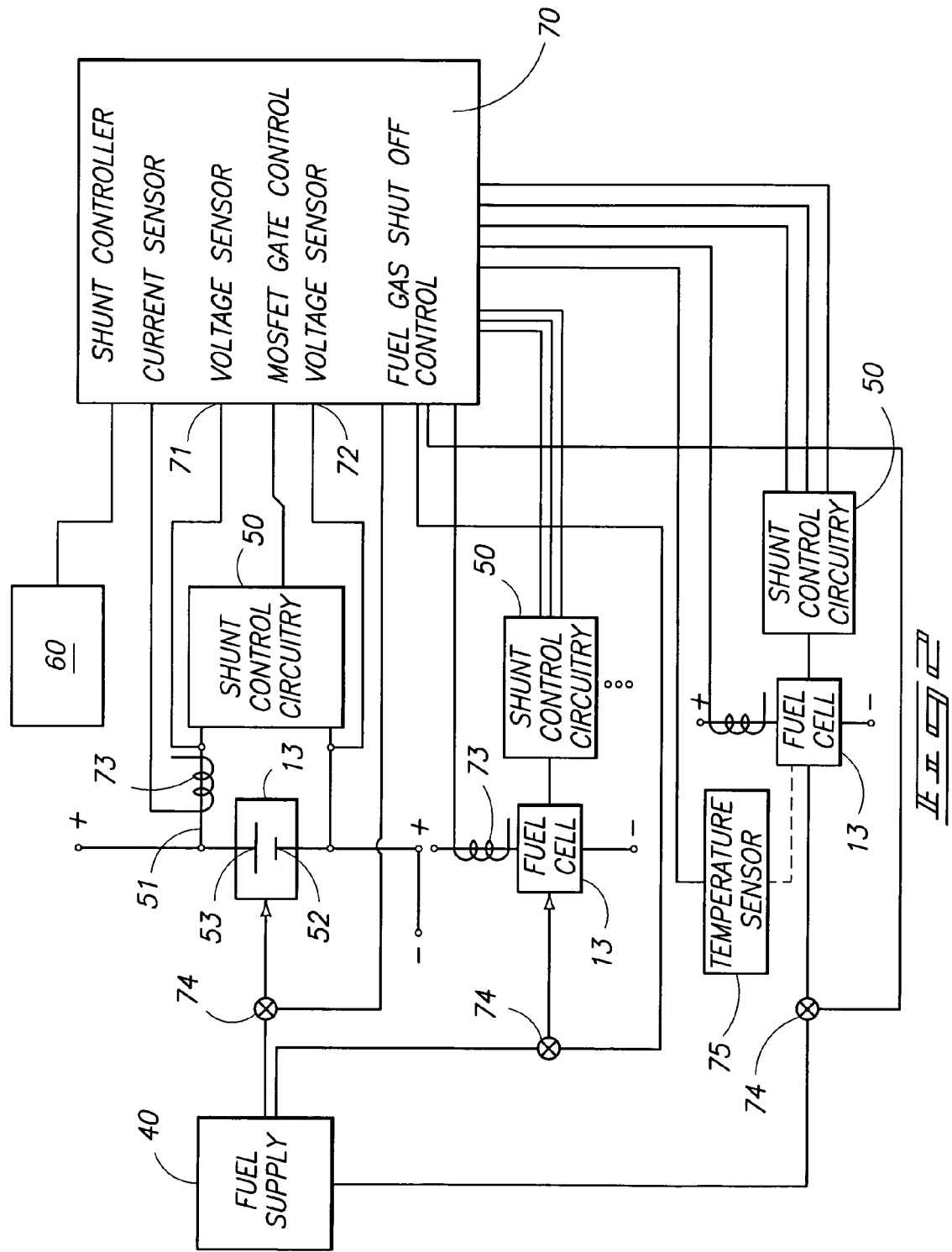
FIG. 2 is a simplified schematic representation of electrical circuitry used in the fuel cell power system as seen in FIG. 1.

Referring now to FIG. 2, the present invention includes a fuel cell 13 which has an anode and a cathode 52 and 53, respectively. The invention also includes, as will be discussed below, first and second circuitry. The first circuitry, as will be discussed hereinafter, is employed for selectively shorting the anode 52 to the cathode 53 so as to simultaneously increase a current and decrease a voltage output of the fuel cell 13; and the second circuitry is employed, as will be discussed hereinafter, for measuring the rate of voltage recovery following the shorting, and wherein the rate of voltage recovery is employed, at least in part, to control and/or monitor the operation of the fuel cell. As will be appreciated from the discussion which follows, the fuel cell 13 requires an appropriate amount of hydration to produce the voltage and current output as provided to the load 41. In the arrangement as will be discussed hereinafter, the rate of voltage recovery is predictive of the amount of hydration of the fuel cell 13. Still further, and as discussed above, the fuel cell 13 includes a gas diffusion layer 22 which is juxtaposed relative to one of the anode or the cathode electrodes 20 or 21, respectively. It has been determined that the rate of voltage recovery is predictive of the amount of hydration in these same gas diffusion layers. Still further, this same rate of voltage recovery is also predictive of an oxygen diffusion rate and/or oxygen concentration at the cathode 20. More to the point, the voltage recovery rate is used to control various operating conditions of the fuel cell module 13 including, at least in part, the operating temperature of same. Still further, the voltage recovery rate may also be employed so as to control the delivery of a source of air to the fuel cell module 13 to control the operating temperature of same. As should be understood, the operating temperature for the fuel cell module is a significant factor in maximizing the voltage and current output of the fuel cell. The voltage recovery rate is further useful in controlling the bus current; fan speed; vane position; and bleed cycle for the same fuel cell power system 10.

As seen in FIG. 2, a plurality of fuel cells or fuel cell modules 13 are shown and which are configured to produce electrical current having a given voltage and current output. In the embodiment as shown in FIG. 2, only a few fuel cells 13 are illustrated for the sake of simplicity. However, in actuality, a plurality of fuel cells or fuel cell modules 13 are provided, and which can be coupled together in series, parallel or a combination of series/parallel arrangements. More particularly, one or more of the fuel cells 13 are contained in each of the fuel cell modules as seen in FIG. 1. The fuel cell power system 10 additionally includes first shunt control circuitry which is generally designated by the numeral 50. Alternative embodiments of the shunt control circuitry 50 are described below in connection with FIGS. 3 and 6, for example. The first shunt control circuitry 50 includes an electrical path 51 which electrically couples the anode 52 and the cathode 53 of one of the fuel cells 13 together. It should be understood that this shunt control circuitry 50 is present for or otherwise associated with each of the respective fuel cells as described above. In one form of the invention (not shown) the electrical path comprises, at least in part, an ultracapacitor which temporarily stores electrical energy generated during the shunting period. This energy which would otherwise be wasted, can be recovered by using an ultracapacitor which is placed in the electrical pathway 24.

The fuel cell power system 10 of the present invention further includes a controller 70. The controller may be alternatively referred to hereinafter as controller 70 or shunt controller 70. In one embodiment, all of the first shunt control circuitries 50 of the fuel cell power system 10 are electrically coupled to a common shunt controller 70. Alternatively, multiple shunt controllers 70 can be employed. In still another embodiment, the shunt controller 70 may be purchased through conventional retail sources. A suitable shunt controller 70 for this application is the programmable microcontroller chip having the trade designation MC68HC705P6A, and which is utilized to perform the program logic as more fully described in U.S. Pat. No. 6,620,538. As noted above, the second circuitry 60 and which is electrically coupled with the shunt controller 70 is employed for measuring the rate of voltage recovery following shorting, as will be described below, and wherein the rate of voltage recovery is employed, at least in part, to control and/or monitor the operation of the fuel cell 13. In this regard, the second circuitry may include a microprocessor which may be commercially purchased under the trade designation Motorola 9S12 and which may be programmed to provide the electrical output as will be described in greater detail hereinafter. It is possible that functions as provided by the second circuitry 60 may be performed by the shunt controller 70 by means of modifications made to programming logic supplied to same.

The shunt controller 70 includes a pair of voltage sensor electrodes (or a pair of voltage sensors) 71 and 72, respectively, for each of the fuel cells 13, and which are electrically coupled with the anode 52 and cathode 53, respectively, and which individually sense the voltage at the anode and cathode of the fuel cell module 13. The fuel cell power system 10 further includes a current sensor 73 for use by the shunt controller 70 in detecting current flow from the fuel cell 13. In one embodiment, the current sensor is in the form of a current shunt that detects current flowing from the fuel cell 13 with a direct electrical connection to the fuel cell 13. In the illustrated embodiment, without a direct electrical connection, the current sensor 73 is a current transformer. Other types of current sensors known in the art could also be employed. In one embodiment, the current sensor 73 and voltage sensors 71 and 72 are separate from the controller 70, although the controller 70 includes circuitry which is used in reading the current and voltage sensors. However, in an alternative embodiment, some or all of the voltage or current sensors are included in the controller 70. Additionally, it will be recognized that the second circuitry 60, in the form of the microprocessor, described above, reads the current and voltage sensors as described, above, in order to calculate the rate of voltage recovery which is useful in the practice of the present invention.

The fuel cell power system 10 of the present invention further includes fuel shut off valves 74 which are disposed in fluid metering relation relative to the supply of source of fuel 40. In this regard, the shunt controller 70 is electrically coupled in controlling relation relative to the respective valves 74. In yet a further embodiment of the present invention, the fuel cell power system 10 further includes a temperature sensor 75 for sensing the temperature of one or more of the fuel cells 13. For example, one or more temperature sensors can be provided per individual module 13, and supported by the housing 11; or temperature sensors can be included in individual modules 13, and coupled by an electrical conduit to the shunt controller 70; or in the alternative, a temperature sensor can be provided for groups of fuel cell modules in various locations within the housing 11.

In the arrangement as seen in FIG. 2, and following, the first shunting circuitry 50 selectively shorts the anode 52 to the cathode 53 according to a shunting duty cycle and a frequency. Thereafter, the voltage recovery rate is determined by the second circuitry 60, and is later employed, at least in part, to adjust the shunting duty cycle and the frequency. In addition to the foregoing, the present fuel cell power system 10 has a bleed duty cycle, and a frequency, as discussed further below, and wherein the voltage recovery rate is determined by the second circuitry 60, and wherein the voltage recovery rate is employed, at least in part, to adjust the bleed duty cycle. Moreover, in the arrangement of the present invention, the duty cycle and frequency, noted above, may be selectively adjusted, based, at least in part, upon the amount of hydration of the fuel cell as predicted by the rate of voltage recovery as calculated by the second circuitry 60.

In the arrangement as seen in FIG. 2 and following, it should be understood that the rate of voltage recovery, as calculated by the second circuitry 60 is predictive of the operational hydration of the fuel cell 13. In the arrangement as shown, the first shunting circuitry 50 includes voltage sensors 71 and 72 which are coupled in voltage sensing relation relative to the fuel cell 13; a current sensor 73 coupled in current sensing relation relative to the fuel cell; and a shunt controller 70 which is electrically coupled with the anode and cathode 52 and 53 of the fuel cell 13, and with the voltage and current sensors. In the arrangement as seen in FIG. 2, the controller 70 selectively electrically shorts the anode to the cathode based, at least in part, upon the operational hydration of the fuel cell 13 as predicted, at least in part, by the rate of voltage recovery as provided by the second circuitry 60. As noted above, the duty cycle and frequency may be adjusted, at least in part, by the controller in response to the operational hydration of the fuel cell as provided by the second circuitry 60. In the arrangement as will be discussed in greater detail hereinafter, the controller 70 is operable to decrease the frequency of the electrical shorting of the anode 52 of the fuel cell, to the cathode 53 thereof, if the operational hydration of the fuel cell exceeds a predetermined threshold. Still further, if the operational hydration of the fuel cell exceeds a predetermined threshold the duration of the electrical shorting of the anode of the fuel cell to the cathode may also be further decreased.

Figure 18:
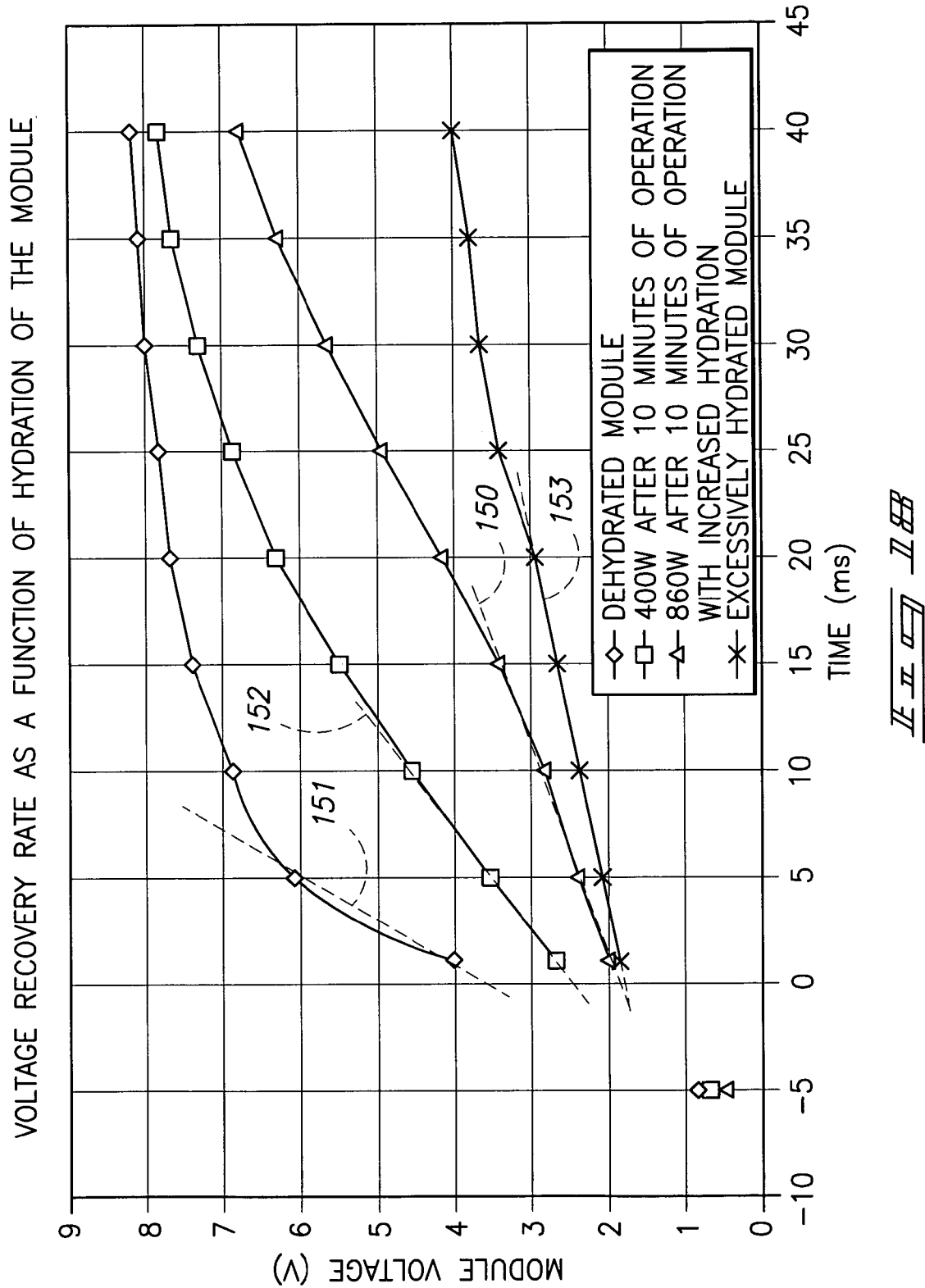
FIG. 18 is a graphical depiction of the fuel cell module output voltage versus time for three fuel cell modules having varying amounts of fuel cell hydration.

In the alternative, the frequency of the periodic shorting may be increased when the fuel cell is operationally dehydrated, as will be discussed in greater detail hereinafter. As seen in FIG. 18 and following, the fuel cell 13 has a voltage recovery rate as defined by a first line, which has a first slope, when the fuel cell is optimally hydrated, and wherein the fuel cell 13 has a voltage recovery rate, as defined by a second line, which has a slope which is about 20% to about 200% greater than the first line, when the fuel cell is operationally dehydrated. This will be discussed in greater detail hereinafter. In addition to the foregoing, the fuel cell has a voltage recovery rate, as defined by a third line, as will be discussed in FIG. 18 and following, and which has a slope of less than about 20% to about 80% of the first line, when the fuel cell is excessively hydrated.

Figure 3:
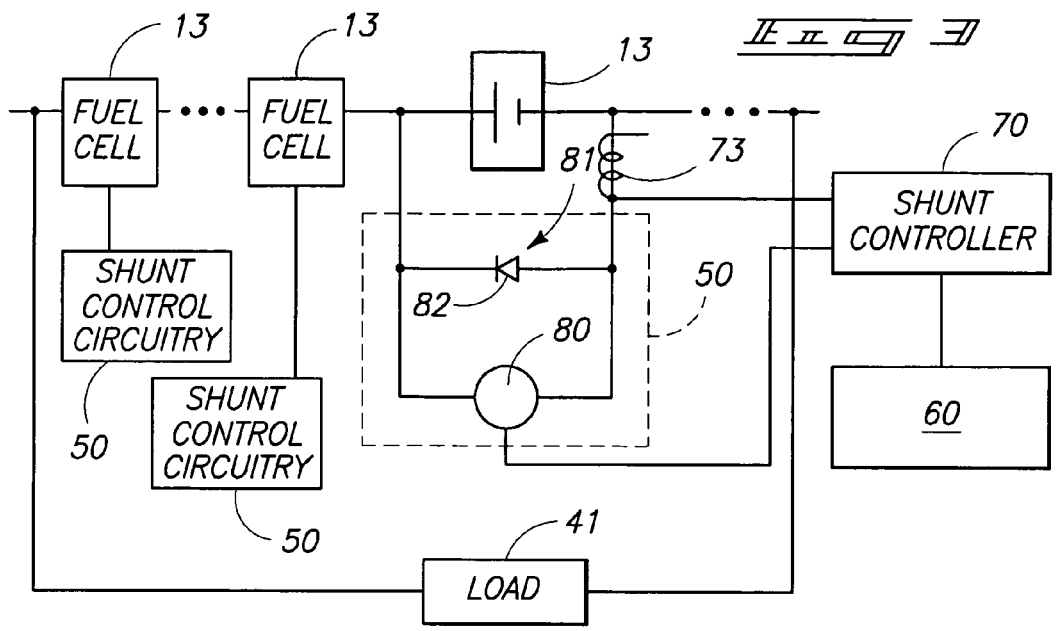
FIG. 3 is a schematic diagram showing shunt control circuitry in accordance with one embodiment of the present invention.

As understood from the discussion above, each fuel cell 13 produces electrical power having a given current and voltage output which is provided to the load 41. The controller 70 is electrically coupled with the respective fuel cells 13, and is operable to shunt the electrical current between the anode 52, and cathode 53 thereof, under predetermined operational conditions. In a further embodiment of the present invention as will be described, below, the controller 70 upon sensing, by way of the voltage and current sensors 71, 72 and 73, a given voltage, and current output of the fuel cell 13, further adjusts the valve 74 associated with that fuel cell into a predetermined fluid metering relation relative to the supply of fuel 40. FIG. 3 illustrates construction details of a first shunting circuitry 50 in accordance with an embodiment of the invention, and which is suitable for a plurality of fuel cells 13 which are electrically coupled together in series. The first shunting circuitry 50 includes an electrical switch 80, here shown as a field effect transistor of conventional design. A suitable commercially acceptable MOSFET may be obtained from Mitsubishi under the trade designation FS100UMJ. The shunting circuitry 50 is electrically coupled to the control electrode, that is, the gate thereof (not shown) of the electrical switch 80.

The first shunting circuitry 50 includes a bypass electrical circuitry 81 which further electrically couples the anode and the cathode, 52 and 53, of each of the fuel cells 13 together. The bypass electrical circuitry comprises a diode 82. The bypass electrical circuitry 81 is operable to provide a current flow path from the anode to cathode of the fuel cell 13 upon failure of the shunt controller 70. In the event that the first shunting circuitry 50 fails in conjunction with a failing or declining fuel cell 13, the bypass electrical circuitry 81 prevents further fuel cell damage from occurring. The diode 82 as seen in the drawing, is normally reversed biased when the associated fuel cell 13 is producing electrical power, and it has substantially no effect on the first shunting circuitry 50 under typical operational conditions. For example, as the voltage output of a failing fuel cell 13 nears 0 or becomes negative, the diode 82 becomes forward biased. In this situation, the electrical current can then travel through the diode 82 instead of the fuel cell 13. In this regard, the maximum negative voltage depends upon the type of the diode selected. A Schottky barrier diode which is commercially available under the trade designation 85CNQ015 may be employed in one embodiment. This commercially available diode allows high current to flow at approximately 0.3 volts. This voltage limitation limits the maximum negative voltage of the fuel cell 13 thereby preventing overheating and subsequent irreparable damage. The switch or field effect transistor 80 has open and closed electrical conditions. For example, the shunt controller 70 positions the switch or field effect transistor 80 in an open or closed electrical condition based, at least in part, upon predetermined performance parameters for the respective fuel cells 30. Still further, and as discussed above, this electrical switch may be placed in an open or closed condition based upon the voltage recovery rate as further calculated by the second circuitry 60.

In a first operational condition, for example, and where a given fuel cell 13 is performing at or below predetermined performance parameters or expectations, such as might occur when the fuel cell membrane electrode diffusion assembly is dehydrated, or does not have the appropriate amount of hydration level, the shunt controller 70 is operable to simultaneously cause the valve 74 for that same failing or declining fuel cell 13 to assume a position where it substantially terminates the supply of fuel gas 40 and places the electrical switch 80 in a closed electrical condition thereby shorting the anode 52 to the cathode 53. This substantially prevents heat related damage from occurring to the fuel cell 13. This might be occasioned when a negative hydration condition has occurred or is presently developing.

Figure 14:
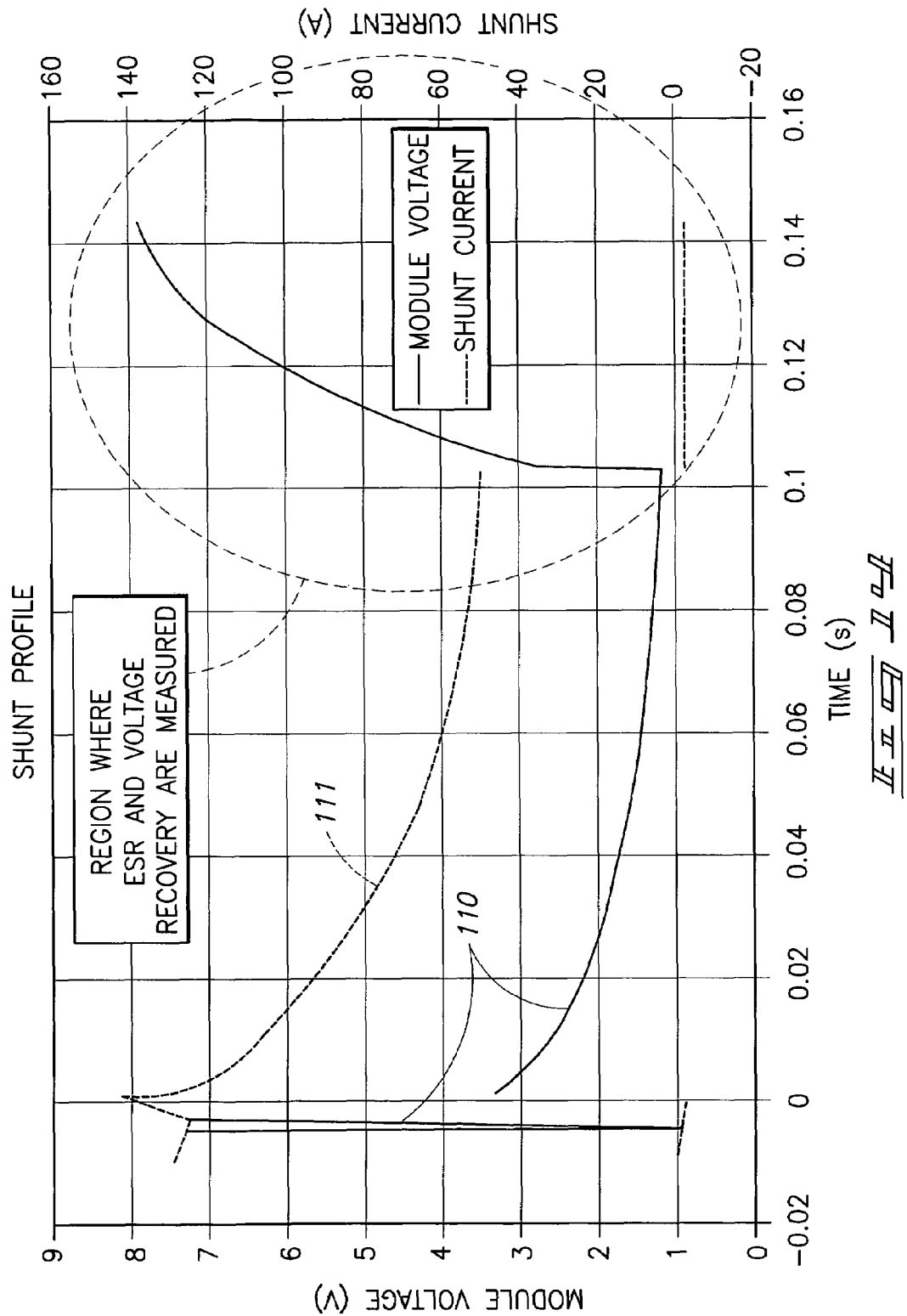
FIG. 14 is a graphical depiction of fuel cell voltage versus shunt current following a shunting operation.

Still further, in the event the electrical switch 80 is subsequently placed in an open position, the shunt controller 70 is operable to cause the valve 74 which is associated with that respective declining or failing fuel cell 13 to be placed in a condition which allows the substantially continuous supply of the source of fuel 40 to the fuel cell 13. As noted above, and following a shunt or electrical shorting which is implemented by the first shunting circuitry 50, and as seen in FIG. 14 and following, the fuel cell 13 experiences a voltage recovery rate which is calculated by the second circuitry 60. This voltage recovery rate may be characterized by various lines, such as a first line 150 which has a first slope when the fuel cell is optimally hydrated, and a second line 151 which has a slope when the fuel cell is operationally dehydrated. As earlier discussed, the slope of the second line as compared to the first line is typically about 20% to about 200% greater than the first line when the fuel cell is operationally hydrated. In addition to the foregoing, the voltage recovery rate may be characterized by a third line 153 which has a slope of less than about 20% to about 80% of the first line when the fuel cell is excessively hydrated. These aspects of the invention will be discussed in further detail hereinafter.

In the case of a fuel cell 13 which is dehydrated, and when the voltage output of the fuel cell 13 is less then about 0.4 volts, the electrical switch 80 assumes a closed position thereby shorting the anode 52 to the cathode 53, while simultaneously causing the valve 74 to terminate the supply of fuel gas 40. As should be understood, a negative hydration situation can result in excessive heat which causes damage to the membrane electrode diffusion assembly. In this first operational condition, the shunting circuitry 50 is operable to pass the current, thereby preventing this heat related damage. As noted above, of course, the performance parameters which may trigger the first operational condition can include one or several declining performance parameters; or declining performance parameters in relative comparison to the performance parameters being achieved by other fuel cells 13; or still further, can be triggered by means of the voltage recovery rate as further calculated by the second circuitry 60 which was described above. In still another operational condition, the first shunting circuitry 50 is operable to increase the resulting electrical power output of the fuel cell 13. In this operational condition, the fuel cells 13 have predetermined performance parameters which comprise, at least in part, selected current and voltage outputs for each of the fuel cells 13. In this condition, and where the performance parameters may be merely declining, and have not decreased below a minimum threshold, the first shunting circuitry 50 is employed in an effort to restore individual and groups of fuel cells 13 to the given performance parameters expected of same. For example, the voltage and current output of one or more fuel cells 13 may begin to decline. As this decline is detected by the first shunting circuitry 50, and the second circuitry 60, the shunt controller 70, in combination with the second circuitry 60, is operable by way of the first shunting circuitry 50 to repeatedly short between the anode and the cathode of the degraded performing fuel cells 13 at individually discreet rates which are effective to restore the fuel cells to the predetermined performance parameters. In yet another example, where the performance parameters are merely declining, the shunt controller 70 is effective to adjust the duty cycle, and frequency of the individual fuel cells 13 by reference to the declining performance parameters of the fuel cell in relative comparison to the performance parameters of other fuel cells to improve the electrical performance of same.

In the operation of the invention, as described, above, the performance parameters of the individual serially electrically coupled fuel cells 13 comprise selected current and voltage outputs of the fuel cell which is supplied, at least in part, to the second circuitry 60, and which is acted upon by the second circuitry 60 in order to determine the voltage recovery rates immediately following shunting. In addition to the foregoing, these threshold performance parameters may be determined by various means including, but not limited to, experiment, operational history, or electrical load, for example. Additionally, the predetermined performance parameters may include merely or generally declining performance parameters over given time intervals or declining intervals within specific voltage ranges. For example, in one form of the invention, a given fuel cell 13 is considered to be performing at or below predetermined parameters if the voltage output of the fuel cell is less than about 0.4 volts. This list of possible parameters, noted above, is not all inclusive and many other physical and operational parameters including the voltage recovery rates as provided by the second circuitry 60 could be utilized, and which would tend to suggest that a selected fuel cell is beginning to fail, and should be disconnected from the fuel cell power system 10 for repair or replacement if the shortcoming in performance is severe, or on the other hand, subjected to increased shorting to determine if the fuel cell 13 can be recovered back to the predetermined parameters selected.

The term "duty cycle" as utilized hereinafter means the ratio of the "on time interval" occupied in operating a device, to the total time of one operating cycle (the ratio of the pulse duration, to the pulse-repetition, that is, time or frequency). Another way of defining the term duty cycle is the ratio of the working time to the total operating time for intermittent operating devices. This duty cycle is expressed as a percentage of the total operating cycle time. In the embodiment as seen in FIG. 2, therefore, the first shunting circuitry 50 is operable to adjust both the duration of the shorting, as well as the operating cycle time, or frequency, as to selective fuel cells 13 in order to restore or maintain the fuel cells above predetermined performance parameters. Enhanced fuel cell performance can be achieved by adjustably repeatedly shorting the anode 52 to the cathode 53 of the fuel cell 13. In this regard, the present invention uses a programmable logic as more fully described in U.S. Pat. No. 6,620,538, the teachings of which are incorporated by reference herein, and which is utilized by the shunt controller 70 to individually, adjustably, and periodically open and close each of the electrical switches 80 at a given frequency, and which are individually electrically coupled and associated with each of the fuel cells 13. Switches 80 may be activated individually, serially, in given groups or patterns, or in any fashion to achieve the predetermined voltage and current output desired. It has been determined that an operating cycle time of about 0.01 seconds to about 4 minutes produces good results, in one form of the invention. When this periodic shorting is implemented, it has been discovered that the voltage output of the fuel cells 13 can increase by at least about 5%. Still further, the shunting circuitry 50 is operable to shunt the electrical current for a duration of typically less than about 20% of the operating cycle. All the foregoing may vary based, at least in part, upon the form of the invention. As should be understood, the periodic increase of the current output of fuel cell due to the shunting conducted by the shunt controller 70 results in a simultaneous decrease in the voltage output of the fuel cell 13. Still further, the periodic reduction of the voltage output of the fuel cell by the controller which is defined by the duty cycle is adjustable, at least in part, upon the rate of voltage recovery of the fuel cell as earlier disclosed by a second line being greater than the slope of the first line 150 and which is more clearly seen by reference to FIG. 18 and following and which will be discussed, below.

Figure 4:
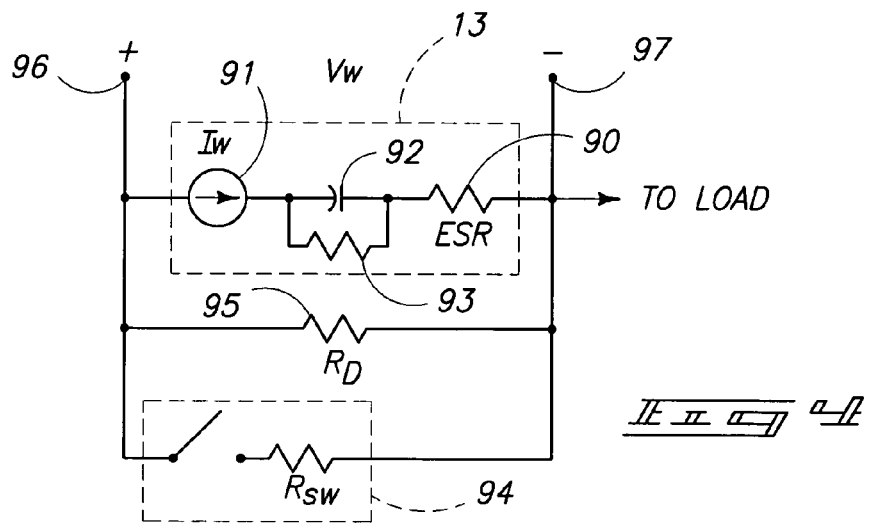
FIG. 4 is an equivalent circuit diagram of the circuitry of FIG. 3 before the electrical shorting of a fuel cell that occurs during a shunting operation.

Referring now to FIG. 4, an equivalent circuit diagram of the circuitry as seen in FIG. 3 is illustrated prior to shorting that occurs during a shunting operation. In this regard, FIG. 4 shows the equivalent series resistance (ESR) of the fuel cell 13, and equivalent series resistance of the electrical switch 80 as seen in FIG. 3. Each fuel cell 13 has an associated equivalent series resistance value, indicated by the numeral 90 in FIG. 4. Additionally, the fuel cell can be represented by a current source 91 placed in series with a parallel combination of a compositor 92 and a resistor 93. This equivalent circuit configuration for a fuel cell 13 is well known in the art. Additionally, shunting circuitry, that is, circuitry including the electrical switch 80 has an equivalent series resistance value, indicated by the reference numeral 94. The diode 82, as earlier discussed, has an equivalent series resistance value indicated with the reference numeral 95. In series with other fuel cells 13, the voltage V provided across the terminals 96 and 97 is normally applied to the load 41, that is, at times outside the of the shunting operations, or at times of maintenance or non-use of a particular fuel cell or cartridge.

Figure 5:
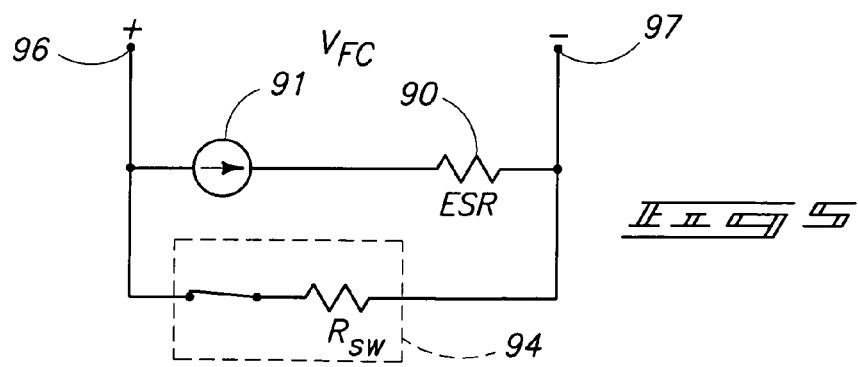
FIG. 5 is an equivalent circuit diagram of the circuitry of FIG. 3 during the electrical shorting of a fuel cell that occurs during a shunting operation.

FIG. 5 is a simplified or equivalent circuit diagram of the circuit shown in FIG. 3 during shorting. More specifically, during shorting, the switch 80 is closed and the electrical path 51 which is formed results in a series connection of the fuel cell 13 with the electrical switch 80.

It is well known that voltage equals the amount of current times resistance. Consequently, the fuel cell 13; electrical switch 80; equivalent series resistance 90; and equivalent series resistance 94, due to the switch, are all in a series relationship during shorting because when the switch 80 is closed, there is a closed circuit connection caused by the switch 80, and virtually no current normally flows through the diode 82.

FIG. 6 shows first shunting circuitry 50B that is used in place of the shunting circuitry 50 of FIG. 2, in an alternative embodiment. More particularly, the shunting circuitry 50B of FIG. 6 is well suited for fuel cell power systems 10 including fuel cells 13 which are arranged in parallel. The first shunting circuitry 50B includes an electrical switch 80B that is substantially similar to the switch 80 as seen in FIG. 3, but which is in parallel with the load 41. The electrical switch 80B has open and closed electrical conditions. Further, the shunt controller 70 selectively opens and closes the switch 80B. The first shunting circuitry 50B further includes a second electrical switch 100 that is substantially similar to the switch 80 as seen in FIG. 3. This same electrical switch is in series with the load 41.

FIG. 7 shows each switch 80B, and electrical switches 80 and 100, (if in the form of a MOSFET), and includes an intrinsic diode which is generally indicated by the numeral 101.

Figure 9:
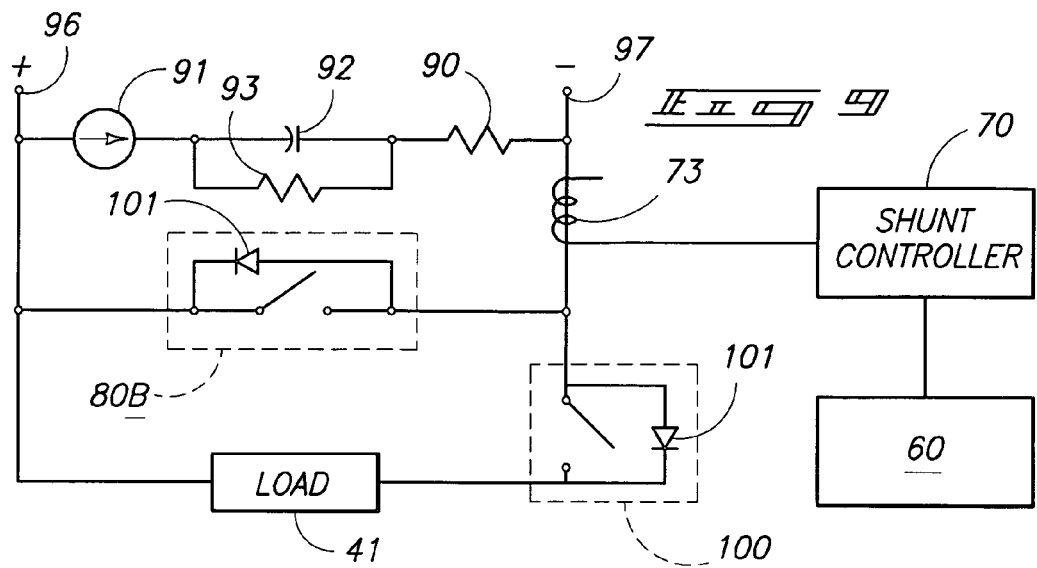
FIG. 9 shows a first step in a sequence of steps, in a shunting operation using the shunt control circuitry as seen in FIG. 6.

FIGS. 8-11 show a sequence of steps involved in a shunting operation using the circuitry of FIG. 9. FIG. 8 is an equivalent circuit diagram of the circuitry of FIG. 6, and which is seen before shunting. The equivalent circuit for the fuel cell is depicted as a current source 91; parallel capacitance 92; and resistor 93, and resistance 90 due to the equivalent series resistance (ESR) as seen in FIG. 3. The equivalent series resistance of the switches can be ignored if only voltage across the fuel cell 13 is considered at various times. The switch 100 is normally closed, and the switch 80 is normally opened.

FIG. 9 is a simplified or equivalent circuit diagram of the circuitry of FIG. 6 after the time represented by FIG. 8. The normally closed switch 100 is opened by the shunt controller 70. The diode 101 of the switch 100 is forward biased, so current flows. There is a very small change in the current (a slight drop in the current due to equivalent series resistance of the electrical switch 100).

Figure 10:
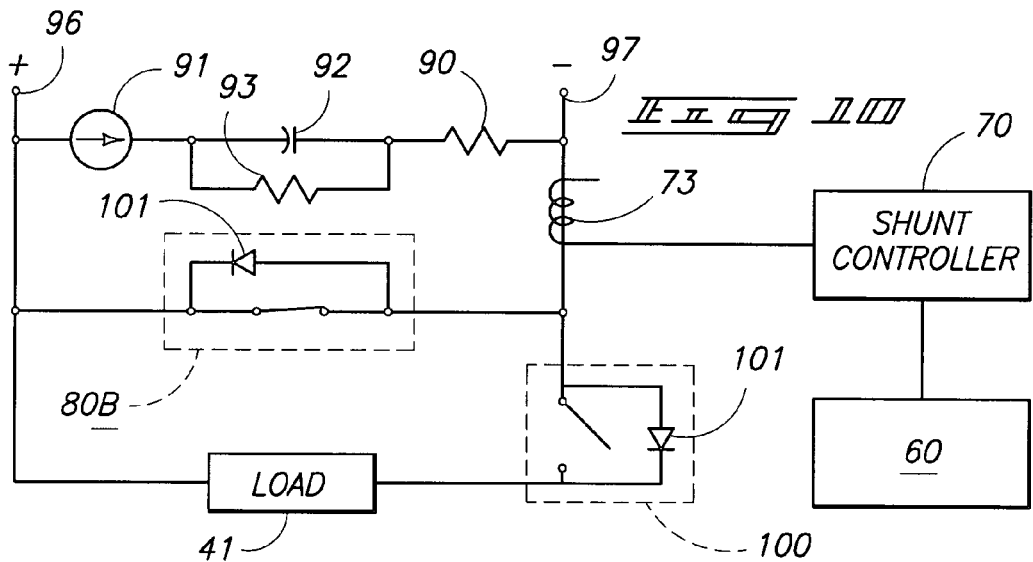
FIG. 10 shows a step, subsequent to the step illustrated in FIG. 9, in the same shunting operation.

FIG. 10 is a simplified or equivalent circuit diagram of the circuitry of FIG. 6 at a time subsequent to that represented by the circuitry shown in FIG. 9. The normally open switch 80B is closed by the shunt controller 70. The diode 101 of the switch 80B is now reversed biased so there is virtually no current to the load 41. Current flows through the short defined by the switch 80B.

Figure 11:
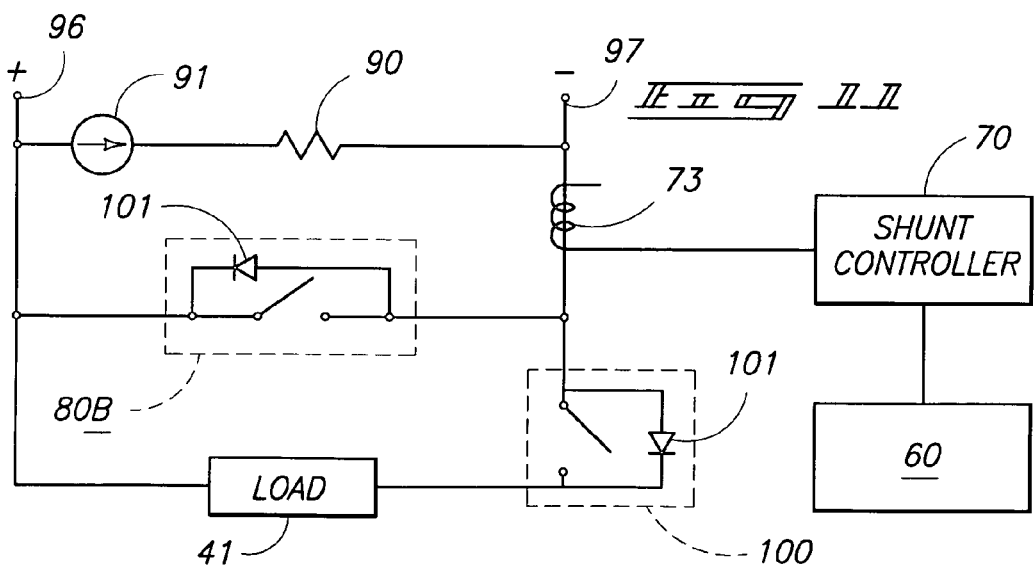
FIG. 11 shows a step, subsequent to the step illustrated in FIG. 10, in the same shunting operation.

FIG. 11 is a simplified or equivalent circuit diagram of the circuitry of FIG. 6 at a time subsequent to the time represented by the circuitry shown in FIG. 10. In this regard, the normally open switch 80B is opened by the shunt controller 70, to remove the short, but the diode 101, of the switch 80B remains reverse biased until the capacitance changes during the time period involved. No current flows until the next shunting operation.

Referring now to FIGS. 14 and following, and as discussed earlier in the application, it will be understood that the present apparatus and method for controlling a fuel cell 10 utilizes the voltage recovery rate of the fuel cell in order to effectively control the operation of the fuel cell in a variety of different manners. As should be evident from the earlier discussion, the present apparatus for controlling a fuel cell 13, and which has a voltage and current output broadly includes, a controller 70 which is operably coupled with the fuel cell 13 and which periodically increases the current output of the fuel cell 13; and circuitry 50 and 60 which is electrically coupled with a controller 70, and which is further disposed in voltage and current sensing relation relative to the fuel cell 13.

Referring now to FIG. 14, it should be understood that the methodology which is described, herein, provides a part of what has been deemed the "self-hydration" mechanism for fuel cells 13 of this particular design. With reference to FIG. 14, the present graphical depiction illustrates a typical shunt profile as provided by a fuel cell module 13 as more fully described in U.S. Pat. No. 6,468,682 and which further is shunted or electrically shorted in accordance with the methodology and apparatus of the present invention. The graph shows the module voltage 110 versus time, and shunt current 111, during a typical shunt. For example, it will be seen that the module voltage decreases significantly as simultaneously the shunting current 111 similarly declines and then, at the termination of the shunt, the module voltage increases significantly. The region of the module voltage 110 which increases significantly is enclosed within a circled region. This circled region represents the region wherein the ESR is measured, and wherein further the voltage recovery measurements which are performed by the second circuitry 60 are also performed. FIG. 14 shows that the shunting performed by the first shunting circuitry 50, results in a periodic reduction of the voltage output of fuel cell 13 and a simultaneous increase in the current output of the fuel cell. As earlier discussed, these periodic reductions are defined by a duty cycle and frequency, and wherein the duty cycle is adjusted, at least in part, upon the rate of voltage recovery of the fuel cell as this defined within the circled region of FIG. 14.

Figure 15:
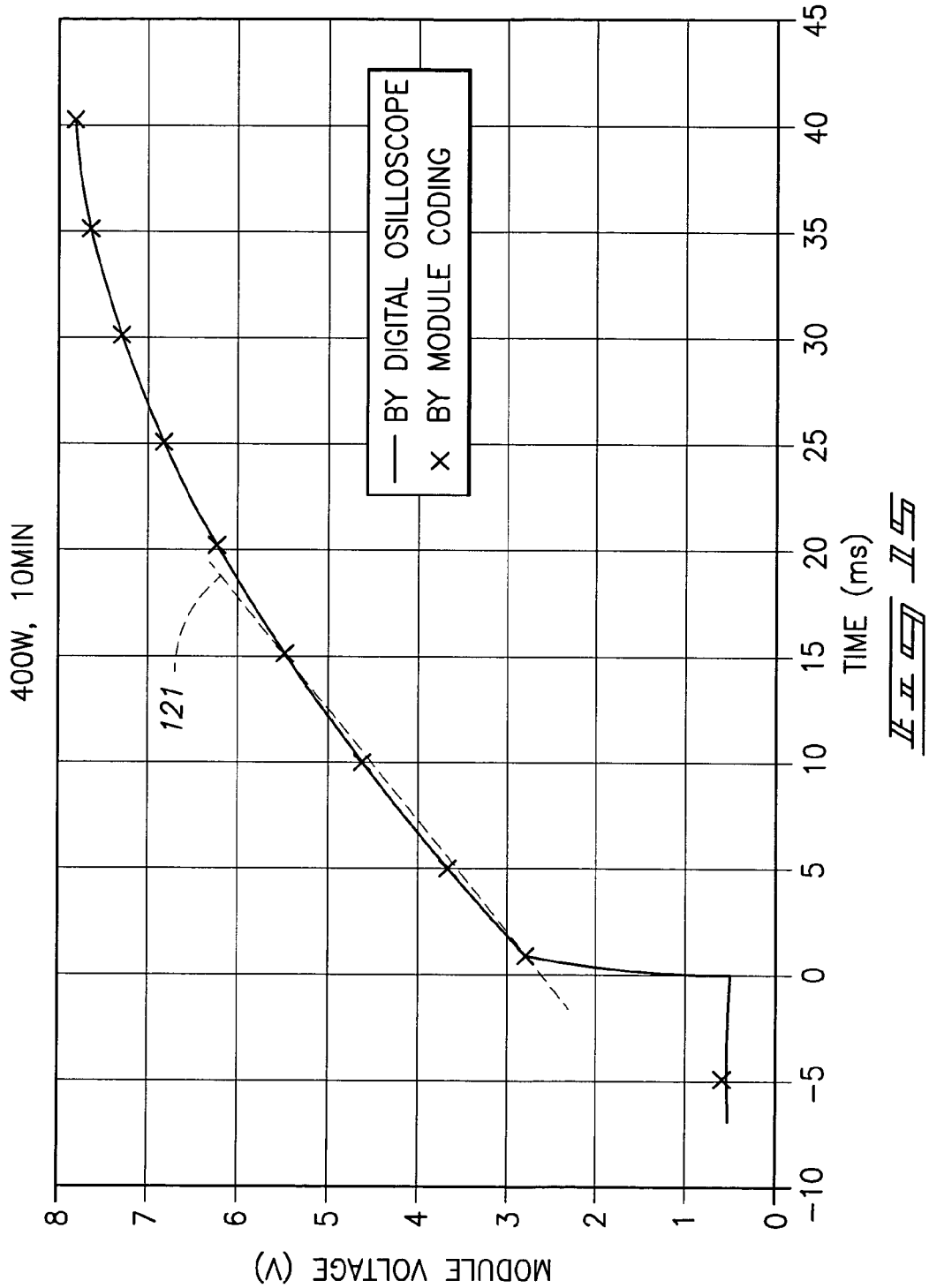
FIG. 15 is a graphical depiction of a fuel cell module voltage versus time following a shunting operation.

Referring now to FIG. 15, this graphical depiction shows a portion of a shunting profile as seen in FIG. 14. More specifically, it shows that portion of the region immediately following shunting, and during the time period from termination of the shunting through approximately 45 milliseconds later. This graph shows the rate of voltage recovery of a fuel cell module 13 as more fully disclosed in U.S. Pat. No. 6,468,682, and which was independently verified by both digital oscilloscope; as well as by the fuel cell module coding as provided by a processor which was coupled to the fuel cell module during operation. It will be seen by studying FIG. 15 that a line 121 having an initial slope can characterize the voltage recovery for the fuel cell performance.

Figure 16:
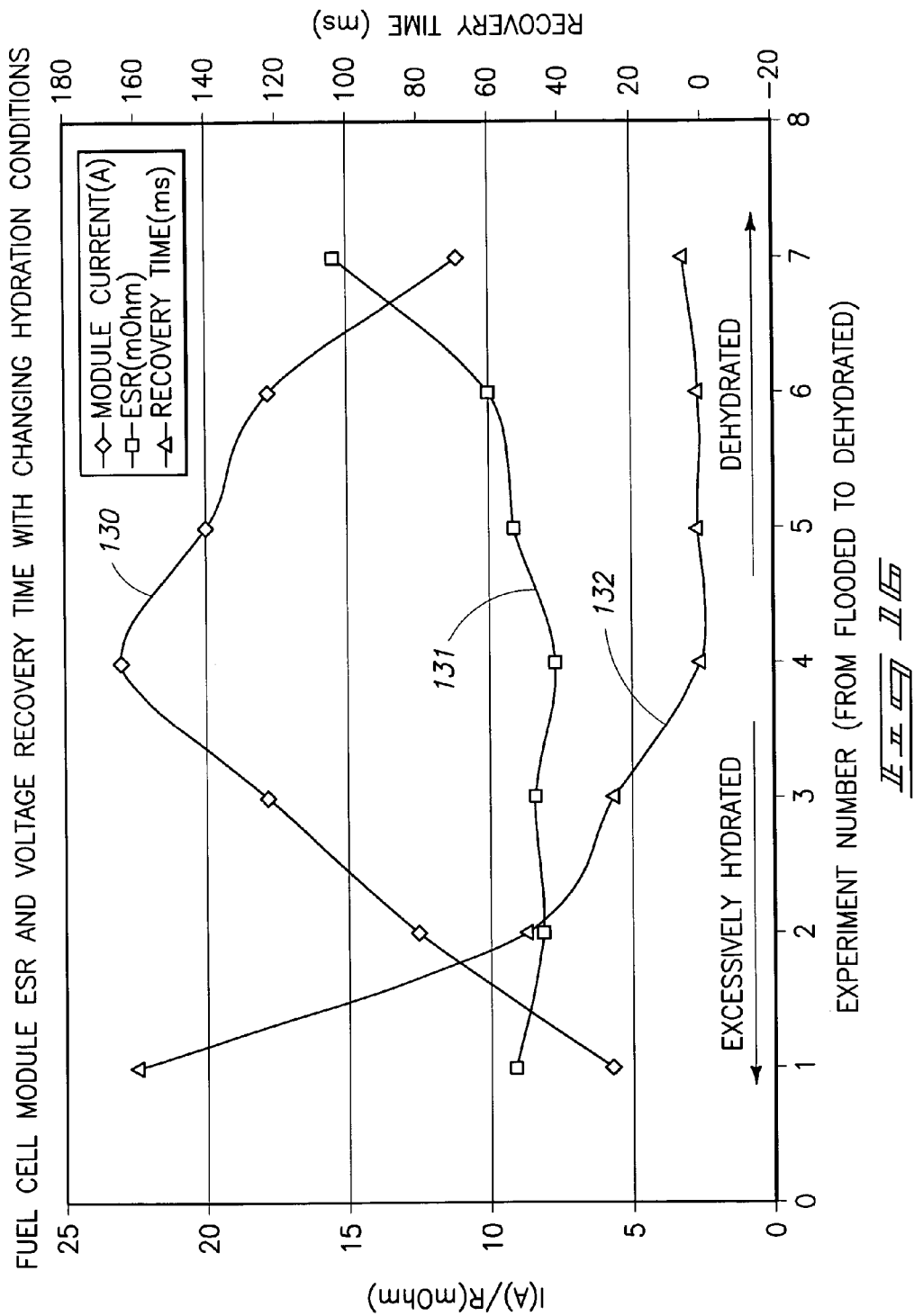
FIG. 16 is a graphical depiction showing the relationship of fuel cell equivalent series resistance (ESR) and voltage recovery with changing hydration conditions.

FIG. 16 shows a graphical depiction of a fuel cell module performance, that being ESR, and voltage recovery time, with changing hydration conditions as performed over a number of experiments. As seen, fuel cell module current 130 is at its lowest when the fuel cell module is in the extreme of either being excessively hydrated; or excessively dehydrated. Fuel cell module current is at its highest when the hydration level of the fuel cell is in a balanced state. Still further, the ESR of the fuel cell module 131 continues to increase as the fuel cell module 13 becomes increasingly dehydrated. A comparison of the curves of lines 130 and 131 suggests that while ESR may be employed as an indicator of fuel cell module hydration, it does not closely mirror line 130. Still further, line 132 shows the fuel cell module voltage recovery time following shunting. It will be seen that the fuel cell recovery time as depicted by line 132 more closely mirrors line 130, and is therefore considered to be a better predictor of fuel cell hydration, although fuel cell recovery time is more difficult to determine.

Figure 17:
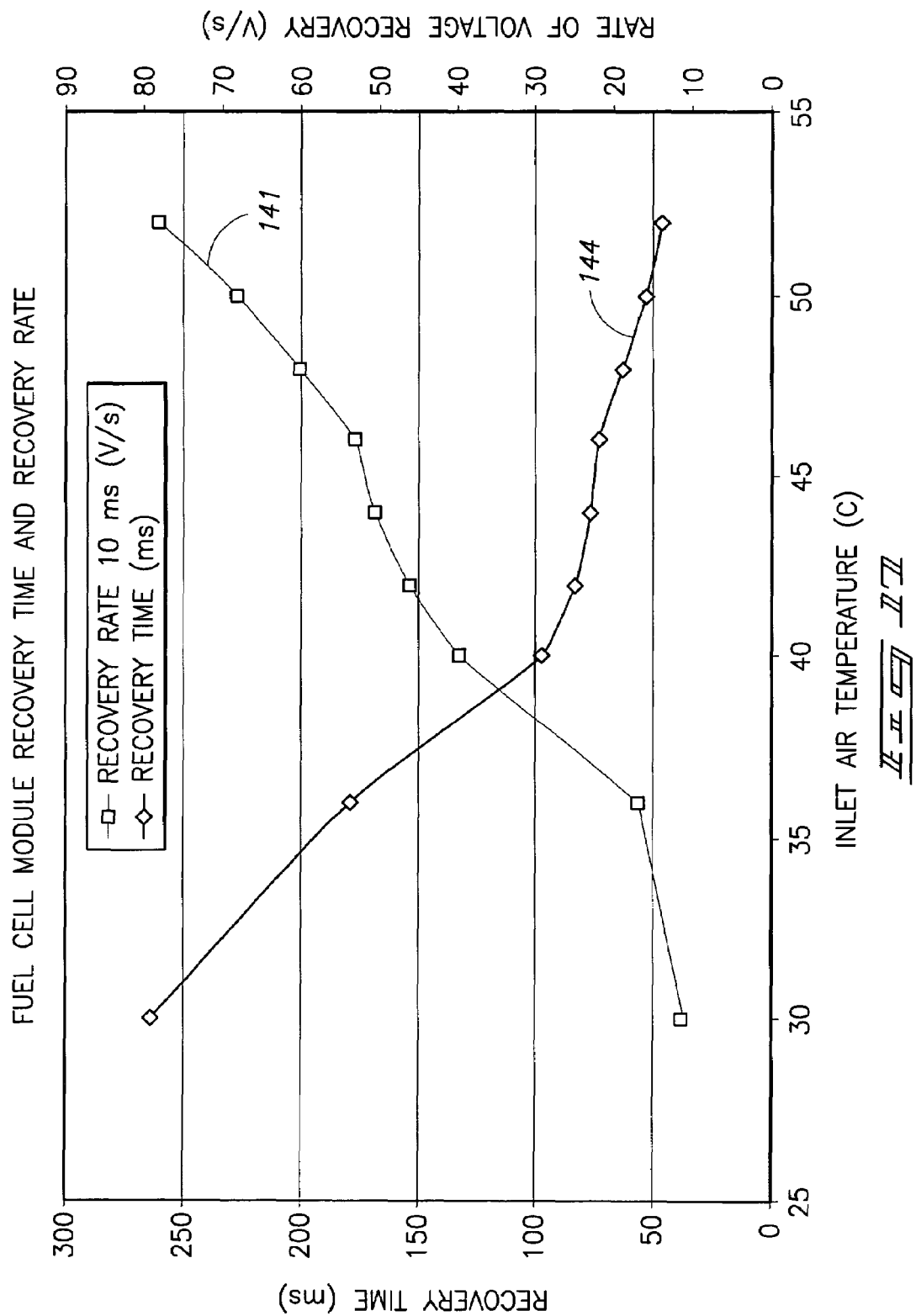
FIG. 17 is a graphical depiction showing the relationship of fuel cell module recovery time, and voltage recovery rate versus the air temperature provided to the fuel cell.

Referring now to FIG. 17, a graphical depiction is shown of the fuel cell module 13 recovery time 144 and voltage recovery rate 141 as a function of inlet air temperature. It should be understood that an increased inlet air temperature tends to be associated with increasing dehydration of the fuel cell module 13. It should be noted that the voltage recovery rates as calculated for the line 141 were all taken at 10 milliseconds. As seen, with an increase in temperature or increased dehydration, the voltage recovery rates and recovery times increase. It should be noted that he voltage recovery rate 141 is nearly a mirror image of the time of recovery 144. However, measurements of the voltage recovery rate are much easier to calculate then what is depicted with respect to the time of recovery.

In the present invention, ESR or equivalent series resistance is one measure of what is believed to be membrane hydration since ESR is directly related to membrane conductivity, that is, it is directly related to membrane hydration. In the present fuel cell invention, the goal is to achieve an ESR which is as low as possible, at operational conditions, in order to favor electrode reactions and minimize ohmic loss.

Referring now to FIG. 18, a graphical depiction of several voltage recovery rates following shunting, and as a function of the hydration of the fuel cell module 13 is shown. In this regard, a first line 150 shows a voltage recovery rate of a substantially optimally hydrated fuel cell, and which is producing a voltage of approximately 860 watts following about 10 minutes of operation. This first line 150 has a first slope which indicates an optimally hydrated fuel cell. Further, the second line 151 shows a dehydrated fuel cell module 13, and the initial voltage recovery rate which is associated with same. It will be seen that second line 151 has a voltage recovery rate which has a slope of about 20% to about 200% greater than the first line 150, and which shows a fuel cell module 13 which is operationally hydrated. Line 152 shows another fuel cell module which is operationally dehydrated, but less then what is seen with respect to line 151. Again this line has a slope which is about 20% to about 200% greater than the first line 150 which is directed to an appropriately operationally hydrated fuel cell. Further, a third line 153 depicts a fuel cell module which is excessively hydrated. The third line has a slope of les than about 20% to 80% of the first line 150.

Figure 19:
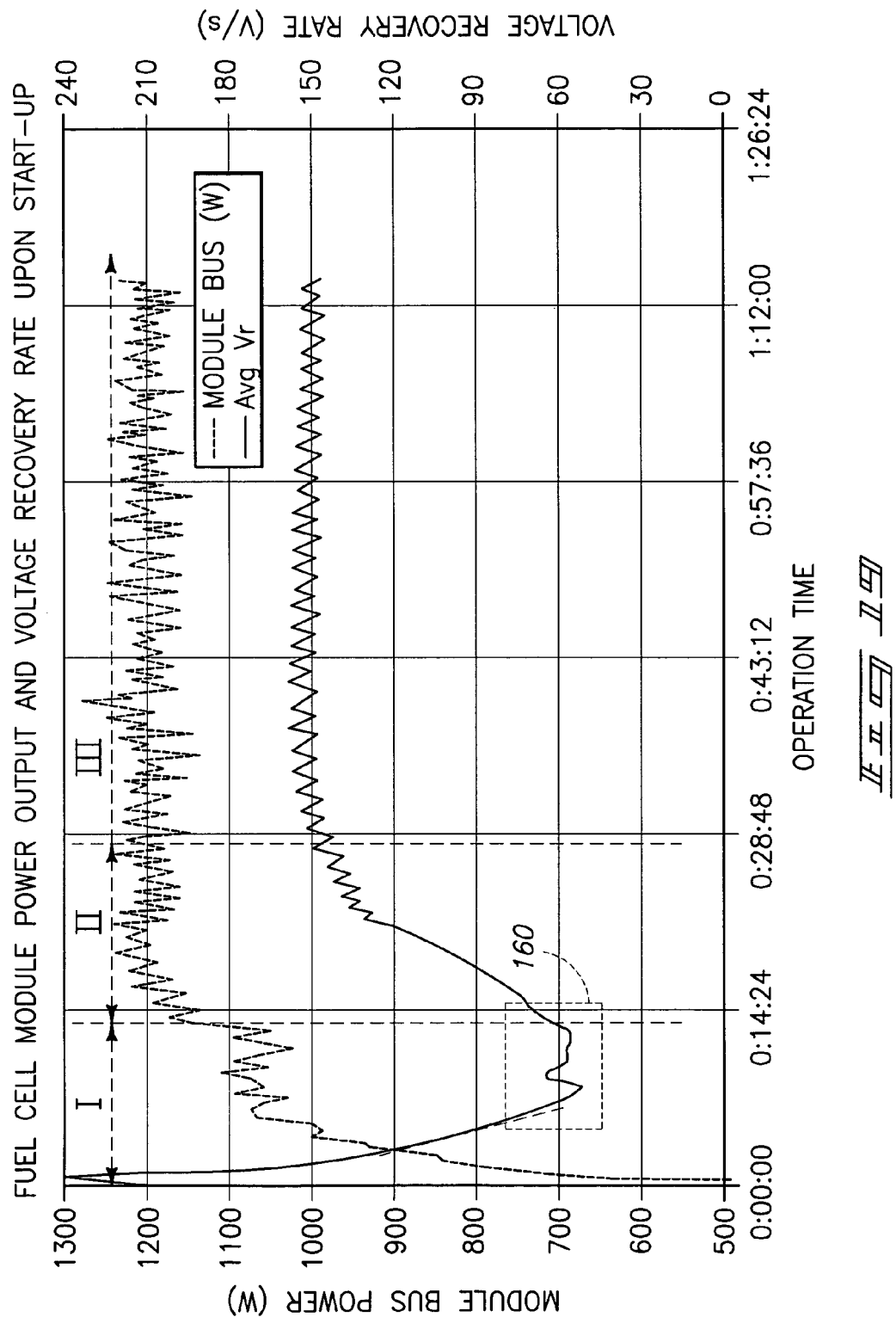
FIG. 19 graphically depicts the relationship of fuel cell module bus power output in comparison to the average voltage recovery rate over an operational period of time.

Referring now to FIG. 19, a graphical depiction of a fuel cell module 13 bus power output, and voltage recovery rate for a fuel cell power system 10 upon start-up of the fuel cell power system 10 is shown. In region I of the graph, it should be understood that the fuel cell module 13 becomes slightly flooded or overly hydrated during the initial startup of the individual fuel cell module. The region 160 indicates that the fuel cell module is excessively hydrated. Region II of this same graphic shows the response of the fuel cell module 13 as improving over time as the excess hydration of the fuel cell is removed. This excessive hydration is typically removed as a result of the steadily increasing fuel cell module temperature as the fuel cell increases in its electrical power output. Region III of this graph shows the relationship of the voltage recovery rate versus fuel cell module bus electrical output for an optimally hydrated fuel cell and the relationship of the two. It will be appreciated that the respective lines for the fuel cell module bus electrical power output, and the voltage recovery rates are substantially mirror images of each other.

Figure 20:
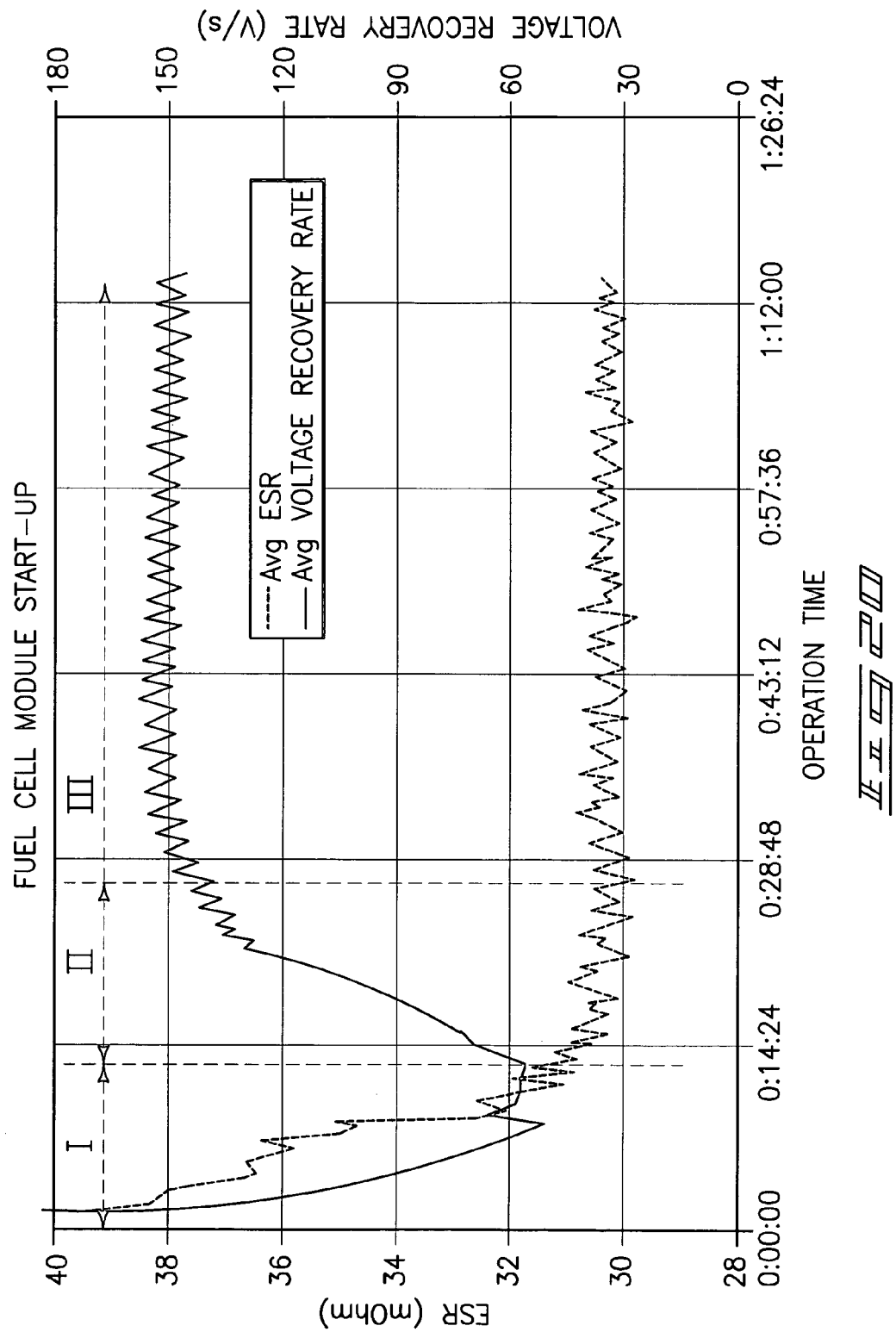
FIG. 20 graphically depicts the ESR for the fuel cell module as it relates to the average voltage recovery rate over an operational time period.
Figure 11:
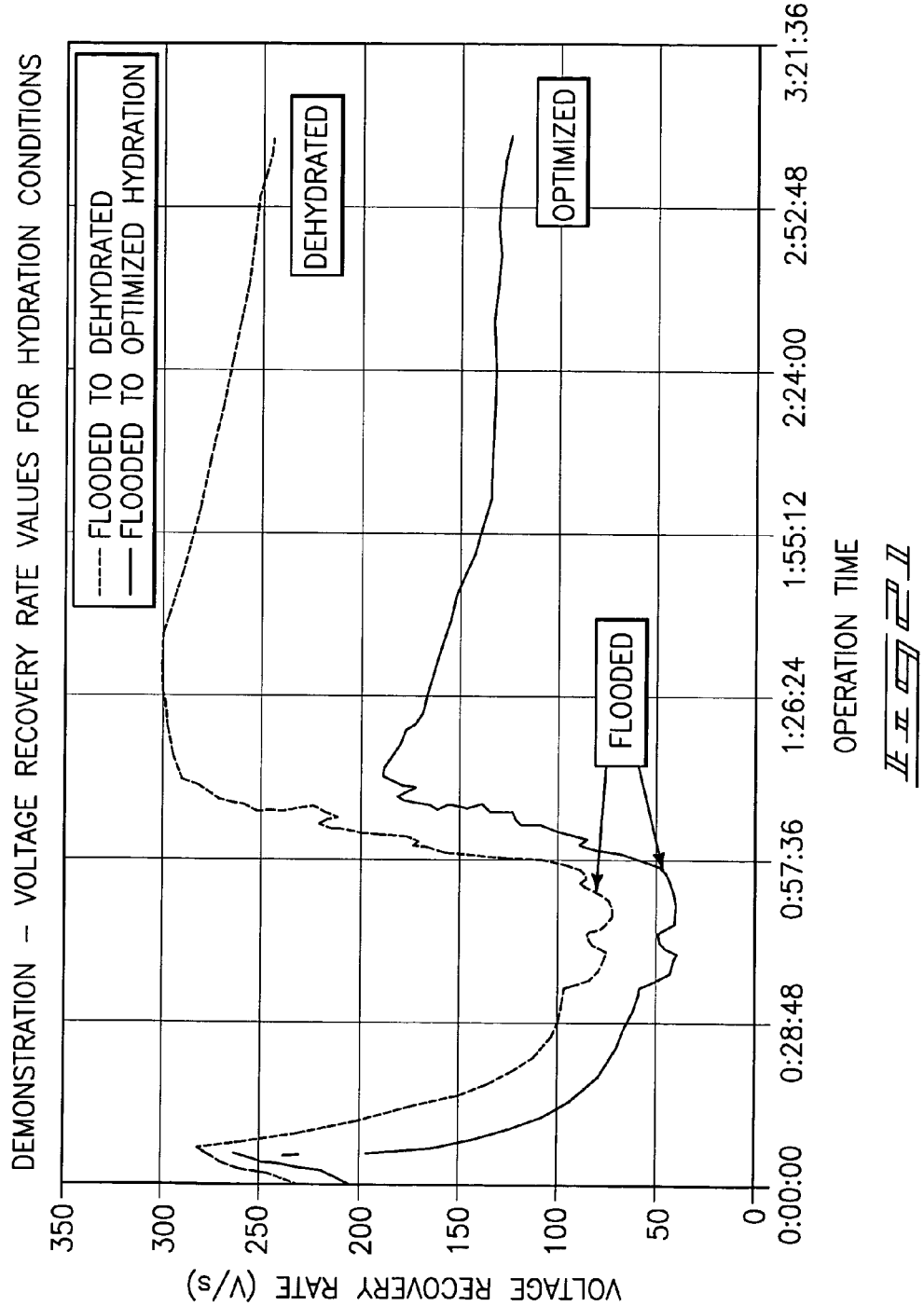

Referring now to FIG. 20, a fuel cell module 13 startup is shown in this graphical depiction, and which shows ESR (equivalent series resistance) expressed in milliohms, as compared against the average voltage recovery rate upon start up. It will be seen that in region I, that upon start up, the fuel cell module rapidly changes from dehydrated to being excessively hydrated. As will be appreciated, at start up, the fuel cell module 13 becomes quickly hydrated, and consequently ESR drops to nearly about 30 milliohms, and the corresponding voltage recovery rate drops to about 50 V/s. As noted in FIG. 19, the fuel cell becomes increasing hydrated to the point of becoming overly hydrated 160 in region I. In region II the fuel cell module 13 continues to increase in its power output. In region II, the ESR, approaches approximately 30 milliohms; and the voltage recovery rate gradually increases to a substantially stable balanced value of near 150 V/s. In region II, the fuel cell module 13 has become operationally hydrated. In region III, the ESR maintains, as a general matter, a minimum of about 30 milliOhms; and the voltage recovery rate is maintained at a substantially stable balanced value of about 150 V/s.

FIG. 21, is a graphical depiction of the voltage recovery rate, over time, and its dependency upon the hydration conditions of the fuel cell module 13. Again, the voltage recovery rate appears to be a more accurate measure of the hydration conditions of a fuel cell module than other indicia which have been used heretofore.

Figure 22:
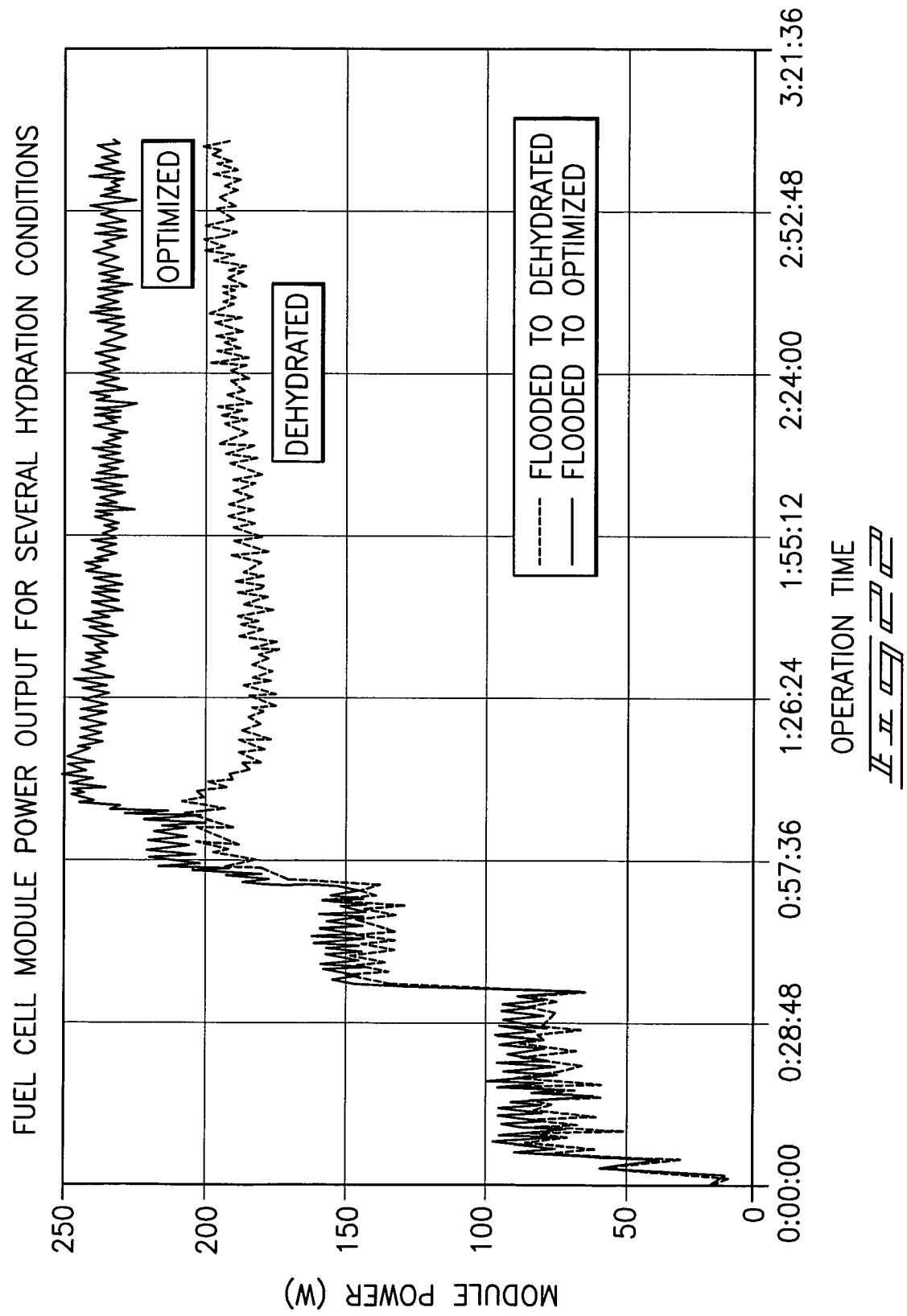
FIG. 22 is a graphical depiction of fuel cell module power output versus hydration conditions for two different fuel cells.
Figure 25:
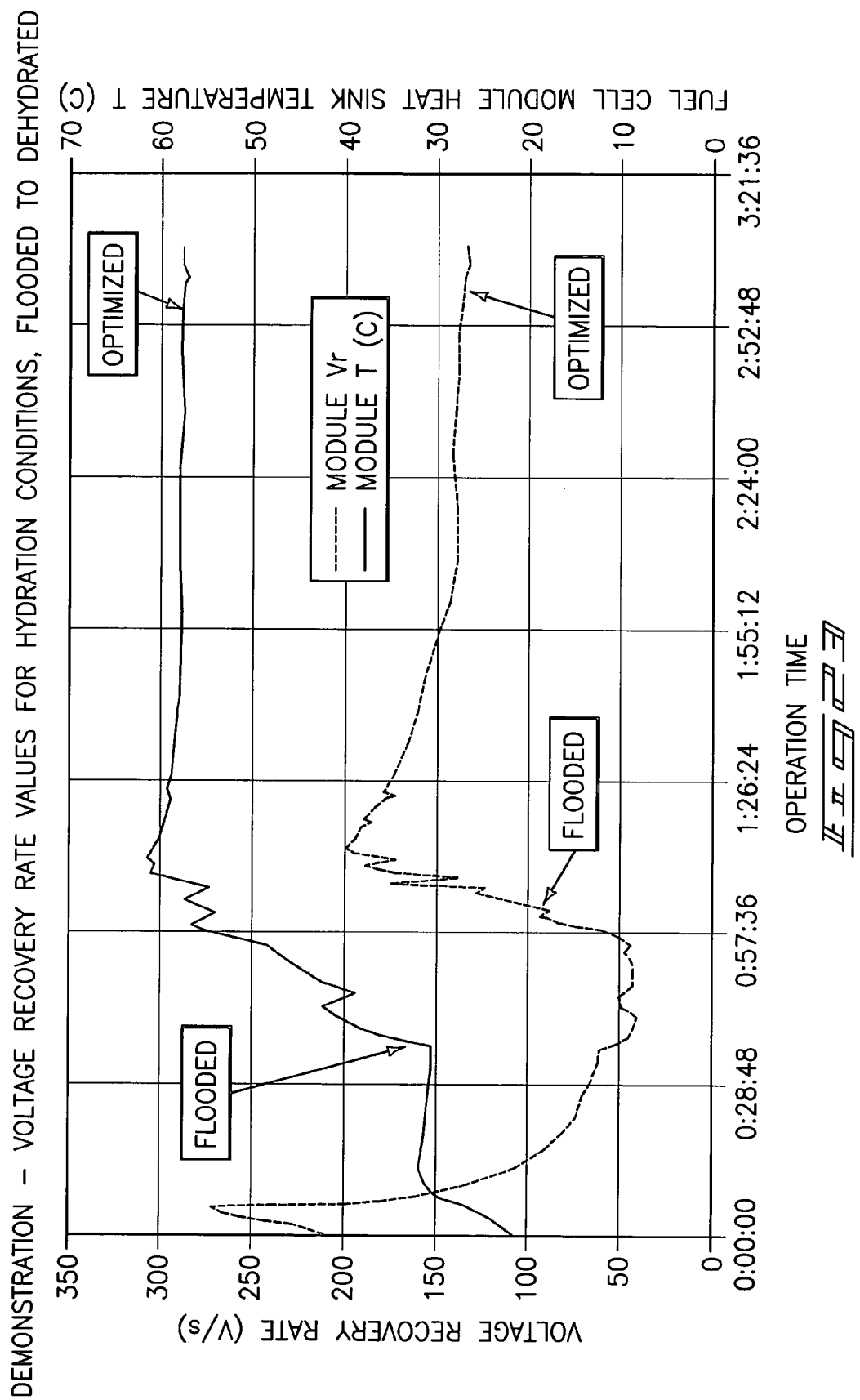

Referring now to FIG. 22, a graphical depiction is provided of fuel cell module 13 power versus time, and which shows the power output of fuel cell modules which have been optimally hydrated versus those that are in a dehydrated state. This is also seen in FIGS. 23 and 24.

Referring now to FIG. 23, the relationship of the voltage recovery; time; and the fuel cell module 13 heat sink temperature is depicted. It will be seen that voltage recovery rate is closely linked to the heat sink temperature, and in the present invention, voltage recovery rate is predictive of the operational temperature; hydration; oxygen concentration; and diffusion rates at the gas diffusion layer 22.

Figure 24:
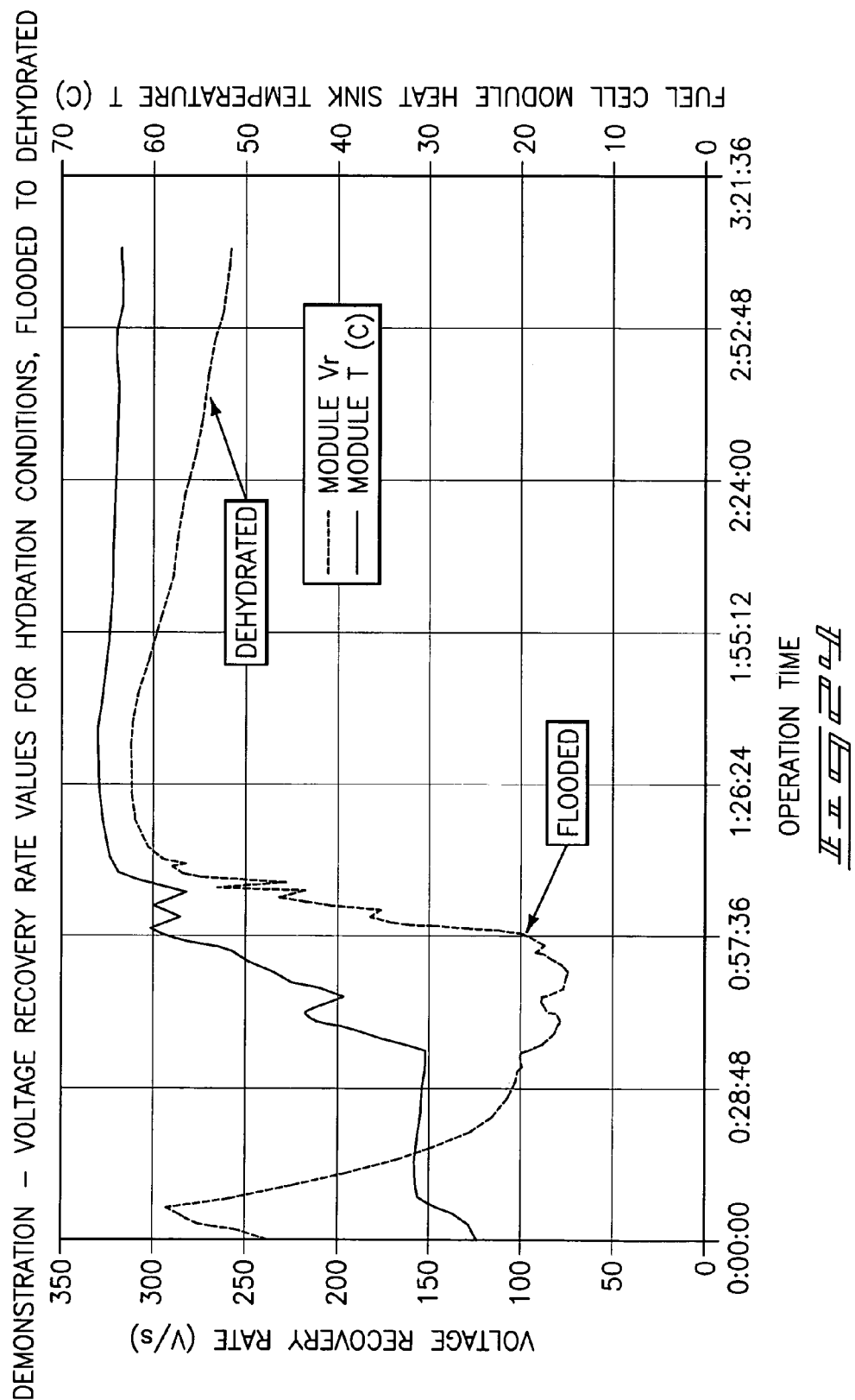
FIG. 24 is a graphical depiction of the voltage recovery rates for a pair of fuel cells having hydration conditions which vary from overly hydrated to dehydrated.

Referring now to FIG. 24, a graphical depiction of the performance of a fuel cell module 13 from a flooded to a dehydrated condition is shown with respect to its voltage recovery rate versus fuel cell module heat sink temperature.

As seen therefore, the apparatus 10 of the present invention, and which is useful for controlling a fuel cell 13 which has a voltage and current output includes a controller 70 which is operably coupled with a fuel cell 13, and which periodically increases the current output of the fuel cell; and circuitry 60 and 70 which is electrically coupled with the controller and which is further disposed in voltage and current sensing relation relative to the fuel cell. In the arrangement as shown, the fuel cell 13 when hydrated has a rate of voltage recovery following the increase of the current output of the fuel cell by the controller and which is defined by a first line 150 having a slope, and wherein the circuitry 60 determines the operational hydration of the fuel cell based, at least in part, upon the relative comparison of the voltage recovery rate of the fuel cell to the slope of the first line 150. As noted above, the periodic increase of the current output of the fuel cell results in a simultaneous decrease in the voltage output of the fuel cell 13. Still further, the periodic reduction in the voltage output of the fuel cell 13, by the controller 70, is controlled, at least in part, by a duty cycle, and wherein the duty cycle is adjusted, at least in part, upon the voltage recovery rate of the fuel cell as defined by a second line 151 being greater than the slope of the first line 150.

Still further, the periodic increase of the current output of the fuel cell 13 by the controller 70 as defined by the duty cycle, referenced above, is adjusted, at least in part, upon the voltage recovery rate of the fuel cell as defined by the third line 153, and a line 154 being less than the slope of the first line 150. As should be understood, the fuel cell, as described, above, and further as illustrated more clearly by reference to FIG. 14 and following, is operationally dehydrated when the slope of the second line 151 is about 20% to about 200% greater than the first line. Still further, the fuel cell is excessively hydrated when the slope of the third line 153 is less than about 20% to about 80% of the slope of the first line 150. In the arrangement as seen, the frequency of the periodic shorting during the shunt cycle increases when the fuel cell is operationally dehydrated and further decreases when the fuel cell is excessively hydrated.

In the arrangement as discussed, above, the fuel cell 13 includes a membrane electrode diffusion assembly 14 which has an integral gas diffusion layer 22. The gas diffusion layer when optimally operationally hydrated allows an amount of oxygen to pass therethrough, and wherein the voltage recovery rate is predictive of the oxygen concentration and diffusion rate at the gas diffusion layer. In the arrangement as previously described, the invention has a voltage sensor 71 which is electrically coupled with the anode and cathode 52 and 53 of the fuel cell 13; and a current sensor 73 which is electrically coupled with the anode and cathode of the fuel cell. The shunt controller 70 is electrically coupled with the anode and cathode of the fuel cell 13 and is operable to measure the voltage and current produced by the fuel cell 13 immediately after the periodic electrical shorting of the anode to the cathode. The rate of voltage recovery immediately after the periodic electrical shorting of the anode to the cathode is predictive of the operational hydration of the fuel cell 13. In the arrangement as seen, the voltage recovery rate as calculated by the second circuitry 60 is operable to control a source of air which is supplied to the fuel cell. This source of air as seen in FIGS. 12 and 13 is, in part, responsible for controlling the operational temperature of the fuel cell.

The present invention 10 also relates to a method for controlling a fuel cell 13, and which includes, as a first step of providing a fuel cell 13 which has an anode 52 and a cathode 53, and which produces electrical power having a current and voltage output. Still further, the method includes another step of periodically electrically shorting the anode 52 of the fuel cell to the cathode 53 of the fuel cell to increase the current output of the fuel cell. Still further, the method includes a step of measuring a rate of voltage recovery experienced by the fuel cell (FIG. 18) in timed relation to the electrical shorting. This step of measuring the rate of voltage recovery experienced by the fuel cell is accomplished by means of the second circuitry 60 as earlier described. Still further, the method includes a step of determining the amount of hydration of the fuel cell from the measured rate of voltage recovery. As earlier described, the amount of hydration of the fuel cell is determined by a review and comparison of the voltage recovery rate in comparison to a first line 150 which, as previously described, is directed to an optimally hydrated fuel cell. In the present methodology, the step of determining the amount of hydration of the fuel cell includes a further step of determining an operational hydration of the fuel cell 13 and which will produce an optimal sustainable voltage and current output. In this regard, the optimal sustainable voltage and current output is defined by a voltage recovery rate as defined by a first line 150 having a first slope. In this regard, the rate of voltage recovery experienced by a less than optimally hydrated fuel cell 13 in timed relation relative to the electrical shorting as provided by the shunt controller 70 is defined by second and third lines 151, 153 having a second slope. As seen, the second slope may be greater than, or less than the first slope. Based upon the slope of the second line, the methodology includes the step of selectively adjusting the periodic electrical shorting of the anode to the cathode of the fuel cell based, at least in part, upon whether the second slope is greater than or less than the first slope.

In the methodology as described above, the step of selectively adjusting the electrical shorting of the anode 52 to the cathode 53 further includes the steps of providing a controller 70 which is electrically coupled with the fuel cell 13; implementing a duty cycle and frequency for the periodic electrical shorting by utilizing the controller; and adjusting the duty cycle and frequency of the periodic electrical shorting, at least in part, by reference to whether the second slope is greater than or less than the first slope. As earlier described, the fuel cell 13 includes a gas diffusion layer 22 which is juxtaposed relative to the cathode 53, and the method further includes the step of determining an oxygen concentration at the gas diffusion layer from the measured voltage recovery rate. In the arrangement as seen, the fuel cell 13 has an operational temperature and the methodology of the present invention further includes the step of controlling the operating temperature of the fuel cell from the measured voltage recovery rate. As earlier described, the present invention also includes a step of adjusting the periodic electrical shorting of the anode to the cathode which is achieved by the shunt controller 70 by reference to the determined amount of hydration of the fuel cell so as to selectively adjust the voltage and current output of the fuel cell.

Another aspect of the methodology of the present invention relates to a method for controlling a fuel cell 13 and which includes, as a first step, providing a fuel cell 13 which has a first membrane electrode diffusion assembly 15, and wherein the first membrane electrode diffusion assembly has an anode 52, a cathode 53, and a gas diffusion layer 22. The methodology includes another step of providing a source of fuel 40, to the anode side 52 of the first membrane electrode diffusion assembly, and further providing a source of an oxidant to the cathode side 53 of the first membrane electrode diffusion assembly. In this step, the fuel cell produces a voltage and current output when supplied with the sources of fuel and oxidant. The methodology includes another step of providing a voltage sensor 71 which is electrically coupled in voltage sensing relation relative the first membrane electrode diffusion assembly. The methodology includes another step of providing a current sensor 73 which is electrically coupled in current sensing relation relative to the first membrane electrode diffusion assembly 15.

The methodology also includes a step of providing a controller 70 which is electrically coupled with the first membrane electrode diffusion assembly, and which is configured to periodically electrically short the anode 52 to the cathode 53 thereof, and which substantially increases the current output of the first membrane electrode diffusion assembly.

The methodology as described above also includes a step of previously determining an optimal sustainable voltage and current output for a substantially identical second membrane electrode diffusion assembly.

The method includes a step following the determination of the optimal sustainable voltage, of measuring the voltage recovery rate of the second membrane electrode diffusion assembly which is producing the optimal sustainable voltage and current output immediately following the electrical shorting of the second membrane electrode diffusion assembly. In this step, the optimal sustainable voltage and current output is indicative of an optimal hydrated state for the second membrane electrode diffusion assembly.

Following the step of measuring the rate of voltage recovery of the second membrane electrode diffusion assembly the methodology includes a step of periodically electrically shorting the anode to the cathode of the first membrane electrode diffusion assembly, and further measuring the voltage recovery rate of the first membrane electrode diffusion assembly immediately following the periodic electrical shorting of the anode to the cathode thereof. The methodology as described further includes a step of determining whether the rate of recovery of the voltage of the first membrane electrode diffusion assembly immediately following the periodic electrical shorting is greater than or less than the voltage recovery rate as experienced by the substantially identical second membrane electrode diffusion assembly. Following this step, the methodology includes a further step of predicting the operational hydration of the first membrane electrode diffusion assembly, based, at least in part, upon whether the voltage recovery rate of the first membrane electrode diffusion assembly is greater or less than the voltage recovery rate as experience by the substantially identical second membrane electrode diffusion assembly. The methodology further includes the step of adjusting the frequency and duration of the periodic electrical shorting of the first membrane electrode diffusion assembly to optimize both the operational hydration of the first membrane electrode diffusion assembly, and the electrical current and voltage output thereof. In the arrangement as previously described, the voltage recovery rate is useful for both adjusting the operational temperature, as well as determining an oxygen concentration at the gas diffusion layer. Still further, this same voltage recovery rate may be utilized to control the operating temperature of the fuel cell by selectively providing a source of air to the cathode of the fuel cell 13 as earlier described.

Operation

The operation of the described embodiment of the present invention is believed to be readily apparent and is briefly summarized at this point.

In summary, the present invention relates to an apparatus and method for controlling a fuel cell which has an anode 52 and a cathode 53 and which includes first circuitry 50 for selectively shorting the anode 52 to the cathode 53 so as to simultaneously increase a current, and decrease a voltage output of the fuel cell; and second circuitry 60 is provided for measuring the rate of voltage recovery following shorting, and wherein the rate of voltage recovery is employed, at least in part, to control and/or monitor the operation of the fuel cell 13, and more specifically is predictive of the amount of hydration of the fuel cell. In the present invention, a method for controlling a fuel cell is provided and which includes the steps of providing a fuel cell 13 which has an anode 52 and a cathode 53, and which produces electrical power having a current and voltage output, and further periodically electrically shorting the anode of the fuel cell to the cathode of the fuel cell 13 to increase the current output of the fuel cell. Following the step of electrically shorting the anode to the cathode, the methodology includes the step of measuring a rate of voltage recovery experienced by the fuel cell in timed relation to the electrical shorting; and determining the amount of the hydration of the fuel cell 13 from the measured voltage recovery rate and controlling various operational parameters thereof.

Therefore it will be seen that the present invention provides a convenient means for further controlling the operation of a fuel cell in a manner not possible heretofore and further avoids many of the shortcomings attendant with the prior art practices utilized on similar assemblies.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for controlling a fuel cell which has an anode and a cathode, comprising:
    first circuitry for selectively shorting the anode to the cathode so as to simultaneously increase a current and decrease a voltage output of the fuel cell;
    second circuitry for measuring the rate of voltage recovery following shorting, wherein the rate of voltage recovery is employed, at least in part, to control and/or monitor the operation of the fuel cell; and
    wherein the fuel cell requires an amount of hydration to produce the voltage and current output, and wherein the rate of voltage recovery is predictive of the amount of hydration of the fuel cell.

2. An apparatus as claimed in claim 1, and wherein the fuel cell further comprises a gas diffusion layer which is juxtaposed relative to one of the anode or the cathode, and wherein the rate of voltage recovery is predictive of the amount of hydration in the gas diffusion layer.

3. An apparatus as claimed in claim 1, and wherein the fuel further comprises a gas diffusion layer which is juxtaposed relative to the cathode, and which permits oxygen to diffuse therethrough, and wherein the rate of voltage recovery is predictive of the an oxygen diffusion rate and/or oxygen concentration at the cathode.

4. An apparatus as claimed in claim 1, and wherein the fuel cell in operation has an operating temperature, and wherein the voltage recovery rate is employed, at least in part, to control the operating temperature.

5. An apparatus as claimed in claim 1, and wherein the fuel cell, in operation, has an operating temperature, and wherein the fuel cell further comprises a source of air which is supplied in an amount to the fuel cell to control the operating temperature, and wherein the voltage recovery rate is employed, at least in part, to control the amount of air supplied to the fuel cell.

6. An apparatus as claimed in claim 1, and wherein the fuel cell, in operation, has a voltage and current output which is supplied to a load, and wherein the voltage recovery rate is employed, at least in part, to control the voltage and current output of the fuel cell.

7. An apparatus as claimed in claim 1, and wherein the first circuitry selectively shorts the anode to the cathode according to a shunting duty cycle and a frequency, and wherein the voltage recovery rate is employed, at least in part, to adjust the shunting duty cycle and the frequency.

8. An apparatus as claimed in claim 1, and wherein the fuel cell has a bleed duty cycle, and a frequency, and wherein the voltage recovery rate is employed, at least in part, to adjust the bleed duty cycle and the frequency.

9. An apparatus as claimed in claim 1, and wherein the first circuitry selectively shorts the anode to the cathode according to a duty cycle, and frequency, and wherein the duty cycle, and frequency is selectively adjusted, based, at least in part, upon the amount of hydration of the fuel cell as predicted by the rate of voltage recovery.

10. An apparatus as claimed in claim 1, and wherein the rate of voltage recovery is predictive of the operational hydration of the fuel cell, and wherein the first circuitry further comprises:
    a voltage sensor coupled in voltage sensing relation relative to the fuel cell;
    a current sensor coupled in current sensing relation relative to the fuel cell; and
    a controller electrically coupled with the anode and cathode of the fuel cell, and with the voltage and current sensors, and wherein the controller selectively electrically shorts the anode to the cathode based, at least in part, upon the operational hydration of the fuel cell as predicted, at least in part, by the rate of voltage recovery.

11. An apparatus as claimed in claim 10, and wherein the controller electrically shorts the anode to the cathode according to a duty cycle and a frequency, and wherein the duty cycle and the frequency of the electrical shorting is adjusted by the controller, at least in part, in response to the operational hydration of the fuel cell.

12. An apparatus as claimed in claim 11, and wherein the controller decreases the frequency of the electrical shorting of the anode of the fuel cell, to the cathode thereof, if the operational hydration of the fuel cell exceeds a predetermined threshold.

13. An apparatus as claimed in claim 12, and wherein the controller decreases the duration of the electrical shorting of the anode of the fuel cell, to the cathode thereof, if the operational hydration of the fuel cell exceeds a predetermined threshold.

14. An apparatus as claimed in claim 1, and wherein the fuel cell has a voltage recovery rate as defined by a first line, which has a first slope, when the fuel cell is optimally hydrated, and wherein the fuel cell has a voltage recovery rate, as defined by a second line, which has a slope which is about 20% to about 200% greater than the first line, when the fuel cell is operationally dehydrated.

15. An apparatus as claimed in claim 14, and wherein fuel cell has a voltage recovery rate, as defined by a third line, and which has a slope of less than about 20% to about 80% of the first line, when the fuel cell is excessively hydrated.

16. An apparatus for controlling a fuel cell which has a voltage and current output, comprising:
    a controller which is operably coupled with the fuel cell, and which periodically reduces the voltage output of the fuel cell; and
    circuitry electrically coupled with the controller, and which is further disposed in voltage and current sensing relation relative to the fuel cell, and wherein the fuel cell, when optimally hydrated, has a rate of voltage recovery following the periodic reduction of the voltage output of the fuel cell, by the controller, and which is defined by a first line having a slope, and wherein the circuitry determines the operational hydration of the fuel cell based, at least in part, upon the relative comparison of the rate of voltage recovery of the fuel cell to the slope of the first line.

17. An apparatus as claimed in claim 16, and wherein the periodic reduction of the voltage output of the fuel cell results in a simultaneous increase in a current output of the fuel cell, and wherein the periodic reduction in the voltage output of the fuel cell by the controller is defined by a duty cycle, and wherein the duty cycle is adjusted, at least in part, upon the rate of voltage recovery of the fuel cell, as defined by a second line, being greater than the slope of the first line.

18. An apparatus as claimed in claim 17, and wherein the periodic reduction of the voltage output of the fuel cell, by the controller, is defined by a duty cycle, and wherein the duty cycle is adjusted, at least in part, upon the rate of voltage recovery of the fuel cell, as defined by a third line, being less than the slope of the first line.

19. An apparatus as claimed in claim 17, and wherein the fuel cell is operationally dehydrated when the slope of the second line is about 20% to about 200% greater than the first line.

20. An apparatus as claimed in claim 18, and wherein the fuel cell is excessively hydrated when the slope of the third line is less than about 20% to about 80% of the first line.

21. An apparatus as claimed in claim 19, and wherein the frequency of the periodic reduction in the voltage output of the fuel cell increases when the fuel cell is operationally dehydrated.

22. An apparatus as claimed in claim 18, and wherein the frequency of the periodic reduction in the voltage output of the fuel cell decreases when the fuel cell is excessively hydrated.

23. An apparatus as claimed in claim 16, and wherein the fuel cell membrane has a membrane electrode diffusion assembly which has an integral gas diffusion layer, and wherein the gas diffusion layer, when optimally operationally hydrated, allows an amount of oxygen to pass therethrough, and wherein the rate of voltage recovery is predictive of the oxygen concentration and diffusion rate at the gas diffusion layer.

24. An apparatus as claimed in claim 16, and wherein the fuel cell has an anode and a cathode, and wherein the controller selectively electrically shorts the anode to the cathode, to substantially effect the periodic increase in the current output of the fuel cell.

25. An apparatus as claimed in claim 24, and further comprising:
a voltage sensor electrically coupled with the anode and cathode of the fuel cell; and
a current sensor electrically coupled with the anode and cathode of the fuel cell, and wherein the controller measures the voltage and the current produced by the fuel cell immediately after the periodic electrical shorting of the anode to the cathode, and wherein the rate of recovery of the voltage immediately after the periodic electrical shorting of the anode to the cathode is predictive of the operational hydration of the fuel cell.

26. An apparatus as claimed in claim 25, and wherein the controller is configured, at times, to electrically short the anode of the fuel cell, to the cathode thereof, according to a duty cycle and frequency, and wherein the controller selectively adjusts the duty cycle and frequency of the electrical shorting based, at least in part, upon the hydration of the fuel cell as predicted by the voltage recovery rate.

27. An apparatus as claimed in claim 26, and wherein fuel cell, when operational, has a voltage and current output, and wherein the duty cycle and frequency are selectively adjusted so as to adjust the voltage and current output of the fuel cell.

28. An apparatus as claimed in claim 16, and wherein the voltage recovery rate is employed, at least in part, to control an operating temperature of the fuel cell.

29. An apparatus as claimed in claim 16, and wherein the voltage recovery rate is employed, at least in part, to control a source of air which is supplied to the fuel cell.

30. A method for controlling a fuel cell, comprising:
providing a fuel cell which has an anode and a cathode, and which produces electrical power having a current and voltage output;
periodically electrically shorting the anode of the fuel cell to the cathode of the fuel cell to increase the current output of the fuel cell;
measuring a rate of voltage recovery experienced by the fuel cell in timed relation to the electrical shorting; and
determining the amount of the hydration of the fuel cell from the measured rate of voltage recovery.

31. A method as claimed in claim 30, and wherein the step of determining the amount of hydration of the fuel cell further comprises:
determining an operational hydration for the fuel cell and which will produce an optimal sustainable voltage and current output, and wherein the optimal sustainable voltage and current output is defined by a first line having a first slope; and wherein the rate of voltage recovery experienced by the fuel cell in timed relation relative to the electrical shorting is defined by a second line having a second slope;
determining whether the second slope is greater than, or less than the first slope; and
selectively adjusting the periodic electrical shorting of the anode to the cathode of the fuel cell based at least in part upon whether the second slope is greater than, or less than the first slope.

32. A method as claimed in claim 31, and wherein the step of selectively adjusting the electrical shorting of the anode to the cathode further comprises:
providing a controller which is electrically coupled with fuel cell;
implementing a duty cycle and frequency for the periodic electrical shorting by utilizing the controller; and
adjusting the duty cycle and frequency of the periodic electrical shorting, at least in part, by reference to whether the second slope is greater than or less than the first slope.

33. A method as claimed in claim 31, and wherein the fuel cell includes a gas diffusion layer which is juxtaposed relative to the cathode, and wherein the method further comprises:
determining an oxygen concentration at the gas diffusion layer from the measured voltage recovery rate.

34. A method as claimed in claim 31, and wherein the fuel cell has an operational temperature, and wherein the method further comprises:
controlling the operating temperature of the fuel cell from the measured voltage recovery rate.

35. A method as claimed in claim 31, and further comprising:
adjusting the periodic electrical shorting of the anode to the cathode of the fuel cell by reference to the determined amount of hydration of the fuel cell so as to selectively adjust the voltage and current output of the fuel cell.

36. A method for controlling a fuel cell, comprising:
- providing a fuel cell which has a first membrane electrode diffusion assembly, and wherein the first membrane electrode diffusion assembly has an anode, a cathode, and a gas diffusion layer;
- providing a source of fuel to the anode side of the first membrane electrode diffusion assembly, and providing a source of an oxidant to the cathode side of the first membrane electrode diffusion assembly, and wherein the fuel cell produces a voltage and current output when supplied with the sources of fuel and oxidant;
- providing a voltage sensor which is electrically coupled in voltage sensing relation relative the first membrane electrode diffusion assembly;
- providing a current sensor which is electrically coupled in current sensing relation relative to the first membrane electrode diffusion assembly;
- providing a controller which is electrically coupled with the first membrane electrode diffusion assembly, and which is configured to periodically electrically short the anode to the cathode thereof, and which substantially increases the current output of the first membrane electrode diffusion assembly;
- previously determining an optimal sustainable voltage and current output for a substantially identical second membrane electrode diffusion assembly;
- measuring a rate of voltage recovery of the second membrane electrode diffusion assembly which is producing the optimal sustainable voltage and current output immediately following the electrical shorting of the second membrane electrode diffusion assembly, and wherein the optimal sustainable voltage and current output is indicative of an optimal hydrated state for the second membrane electrode diffusion assembly;
- periodically electrically shorting the anode to the cathode of the first membrane electrode diffusion assembly;
- measuring a rate of the voltage recovery of the first membrane electrode diffusion assembly immediately following the periodic electrical shorting of the anode to the cathode thereof;
- determining whether the rate of recovery of the voltage of the first membrane electrode diffusion assembly immediately following the periodic electrical shorting is greater than or less than the voltage recovery rate as experienced by the substantially identical second membrane electrode diffusion assembly;
- predicting the operational hydration of the first membrane electrode diffusion assembly, based, at least in part, upon whether the voltage recovery rate of the first membrane electrode diffusion assembly is greater or less than the voltage recovery rate as experience by the substantially identical second membrane electrode diffusion assembly; and
- adjusting the frequency and duration of the periodic electrical shorting of the first membrane electrode diffusion assembly to optimize both the operational hydration of the first membrane electrode diffusion assembly, and the electrical current and voltage output thereof.

37. A method as claimed in claim 36, and wherein the method further comprises:
- adjusting an operational temperature of the fuel cell by reference to the voltage recovery rate as determined for the first membrane electrode diffusion assembly.

38. A method as claimed in claim 36, and further comprising:
- adjusting a bleed duty cycle of the fuel cell by reference to the voltage recovery rate as determined for the first membrane electrode diffusion assembly.

39. A method as claimed in claim 36, and further comprising:
- determining an oxygen diffusion rate and/or concentration at the gas diffusion layer by reference to the voltage recovery rate as determined for the first membrane electrode diffusion assembly.

40. A method as claimed in claim 36, and further comprising:
- providing a source of air which is supplied to the cathode of the fuel cell; and
- controlling the volume of air delivered to the cathode of fuel cell by reference to the voltage recovery rate as determined for the first membrane electrode diffusion assembly.

* * * * *